United States Patent
Rosenthal et al.

(10) Patent No.: US 11,520,829 B2
(45) Date of Patent: Dec. 6, 2022

(54) TRAINING A QUESTION-ANSWER DIALOG SYTEM TO AVOID ADVERSARIAL ATTACKS

(71) Applicant: International Business Machines Corporation, Armonk, NY (US)

(72) Inventors: Sara Rosenthal, Spring Valley, NY (US); Avirup Sil, Hopewell Junction, NY (US); Mihaela Ancuta Bornea, White Plains, NY (US); Radu Florian, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 17/076,031

(22) Filed: Oct. 21, 2020

(65) Prior Publication Data

US 2022/0121710 A1 Apr. 21, 2022

(51) Int. Cl.
*G06F 16/9032* (2019.01)
*G06F 21/54* (2013.01)
*G06N 20/00* (2019.01)

(52) U.S. Cl.
CPC ........ *G06F 16/90332* (2019.01); *G06F 21/54* (2013.01); *G06N 20/00* (2019.01)

(58) Field of Classification Search
None
See application file for complete search history.

(56) References Cited

U.S. PATENT DOCUMENTS

| 9,684,876 B2 | 6/2017 | Agarwalla |
| 2017/0091175 A1 | 3/2017 | Kanayama |

(Continued)

FOREIGN PATENT DOCUMENTS

| CN | 111078892 A | 4/2020 |
| CN | 111444346 A | 7/2020 |

(Continued)

OTHER PUBLICATIONS

Marco Tulio Ribeiro, Sameer Singh, and Carlos Guestrin. 2018. Semantically equivalent adversarial rules for debugging NLP models. In ACL.

(Continued)

*Primary Examiner* — Antim G Shah
(74) *Attorney, Agent, or Firm* — Caleb D. Wilkes

(57) ABSTRACT

A method, computer program product, and/or computer system protects a question-answer dialog system from being attacked by adversarial statements that incorrectly answer a question. A computing device accesses a plurality of adversarial statements that are capable of making an adversarial attack on a question-answer dialog system, which is trained to provide a correct answer to a specific type of question. The computing device utilizes the plurality of adversarial statements to train a machine learning model for the question-answer dialog system. The computing device then reinforces the trained machine learning model by bootstrapping adversarial policies that identify multiple types of adversarial statements onto the trained machine learning model. The computing device then utilizes the trained and bootstrapped machine learning model to avoid adversarial attacks when responding to questions submitted to the question-answer dialog system.

20 Claims, 12 Drawing Sheets

(56) References Cited

U.S. PATENT DOCUMENTS

| | | | |
|---|---|---|---|
| 2017/0330079 | A1 | 11/2017 | Akolkar |
| 2019/0371299 | A1* | 12/2019 | Jiang .................. G10L 15/063 |
| 2020/0019642 | A1* | 1/2020 | Dua .................. G06N 3/0454 |
| 2020/0082097 | A1 | 3/2020 | Poliakov |
| 2020/0242250 | A1 | 7/2020 | Chen |
| 2020/0286463 | A1* | 9/2020 | Galitsky .............. G06F 16/35 |

FOREIGN PATENT DOCUMENTS

| | | |
|---|---|---|
| CN | 107423437 B | 9/2020 |
| CN | 108595629 B | 8/2021 |

OTHER PUBLICATIONS

Mikel Artetxe, Sebastian Ruder, and Dani Yogatama. 2020. On the cross-lingual transferability of monolingual representations, in ACL 2020.

Minhao Cheng, Jinfeng Yi, Huan Zhang, Pin-Yu Chen, and Cho-Jui Hsieh. 2018. Seq2sick: Evaluating the robustness of sequence-to-sequence models with adversarial examples. arXiv preprint arXiv. 1803.01128.

Tianxing He and James Glass. 2019. Detecting egregious responses in neural sequence-to-sequence models. In ICLR.

Akari Asai, Akiko Eriguchi, Kazuma Hashimoto, and Yoshimasa Tsuruoka. 2018. Multilingual extractive reading comprehension by runtime machine translation. arXiv preprint arXiv:1809.03275.

Alec Radford, Jeffrey Wu, Rewon Child, David Luan, Dario Amodei, and Ilya Sutskever. 2019. Language models are unsupervised multitask learners. OpenAI Blog , 1(8):9.

Alexey Kurakin, Ian Goodfellow, and Samy Bengio. 2016. Adversarial examples in the physical world. arXiv preprint arXiv:1607.02533.

Alexis Conneau and Guillaume Lample. 2019. Crosslingual language model pretraining. In Advances in Neural Information Processing Systems , pp. 7057-7067.

Alexis Conneau, Kartikay Khandelwal, Naman Goyal, Vishrav Chaudhary, Guillaume Wenzek, Francisco Guzman, Edouard Grave, Myle Ott, Luke Zettlemoyer, and Veselin Stoyanov. 2020. Unsupervised cross-lingual representation learning at scale. In ACL 2020.

Amir Globerson and Sam Roweis. 2006. Nightmare at test time: robust learning by feature deletion. In Proceedings of the 23rd international conference on Machine learning , pp. 353-360.

Ashish Vaswani, Noam Shazeer, Niki Parmar, Jakob Uszkoreit, Llion Jones, Aidan N Gomez, Ł ukasz Kaiser, and Illia Polosukhin. 2017. Attention is all you need. In Advances in Neural Information Processing Systems , pp. 5998-6008. Curran Associates, Inc.

Badri N. Patro, Shivansh Patel, Vinay P. Namboodiri; Robust Explanations for Visual Question Answering, Indian Institute of Technology, The IEEE Winter Conference on Applications of Computer Vision, 2020.

Chih Chieh Shao, Trois Liu, Yuting Lai, Yiying Tseng, and Sam Tsai. 2018. Drcd: a Chinese machine reading comprehension dataset. arXiv preprint arXiv:1806.00920.

Erik Tjong, Kim Sang, and Fien De Meulder. 2003. Introduction to the conll-2003 shared task: Language independent named entity recognition. In Proceedings of the Seventh Conference on Natural Language Learning at HLT-NAACL 2003 , pp. 142-147.

Gu et al., "Towards deep neural network architectures robust to adversarial examples." arXiv preprint arXiv:1412.5068 (2014).

Hussein Mozannar, Elie Maamary, Karl El Hajal, and Hazem Hajj. 2019. Neural Arabic question answering . In Proceedings of the Fourth Arabic Natural Language Processing Workshop , pp. 108-118, Florence, Italy. Association for Computational Linguistics.

Ian J Goodfellow, Jonathon Shlens, and Christian Szegedy. 2015. Explaining and harnessing adversarial examples. ICLR.

Jacob Devlin, Ming-Wei Chang, Kenton Lee, and Kristina Toutanova. 2019. BERT: Pre-training of deep bidirectional transformers for language understanding. In NAACL-HLT.

Javid Ebrahimi, Daniel Lowd, and Dejing Dou. 2018a. On adversarial examples for character-level neural machine translation. In COLING.

Jiwei Li, Will Monroe, Tianlin Shi, Sebastien Jean, Alan Ritter, and Dan Jurafsky. 2017. Adversarial learning for neural dialogue generation. In Proceedings of the 2017 Conference on Empirical Methods in Natural Language Processing , pp. 2157-2169.

Min Joon Seo, Aniruddha Kembhavi, Ali Farhadi, and Hannaneh Hajishirzi. 2016. Bidirectional attention flow for machine comprehension. ICLR.

Minghao Hu, Yuxing Peng, Zhen Huang, Xipeng Qiu, Furu Wei, and Ming Zhou. 2018. Reinforced mnemonic reader for machine reading comprehension . In Proceedings of the Twenty-Seventh International Joint Conference on Artificial Intelligence, JCAI-18 , pp. 4099-4106. International Joint Conferences on Artificial Intelligence Organization.

Noah A Smith. 2012. Adversarial evaluation for models of natural language. arXiv preprint arXiv:1207.0245.

Patrick Lewis, Barias Oguz, Ruty Rinott, Sebastian Riedel, and Holger Schwenk. 2020. MLQA: Evaluating cross-lingual extractive question answering. ACL.

Peng Qi, Timothy Dozat, Yuhao Zhang, and Christopher D Manning. 2018. Universal dependency parsing from scratch. In Proceedings of the CoNLL 2018 Shared Task: Multilingual Parsing from Raw Text to Universal Dependencies, pp. 160-170.

Pranav Rajpurkar, Jian Zhang, Konstantin Lopyrev, and Percy Liang. 2016. SQuAD: 100,000+ questions for machine comprehension of text. EMNLP.

Pranav Rajpurkar, Robin Jia, and Percy Liang. 2018. Know what you don't know: Unanswerable questions for SQuAD . In Proceedings of the 56th Annual Meeting of the Association for Computational Linguistics (vol. 2: Short Papers) , pp. 784-789, Melbourne, Australia. Association for Computational Linguistics.

Robin Jia and Percy Liang. 2017. Adversarial examples for evaluating reading comprehension systems. EMNLP.

Ryan McDonald, Joakim Nivre, Yvonne Quirmbach-Brundage, Yoav Goldberg, Dipanjan Das, Kuzman Ganchev, Keith Hall, Slav Petrov, Hao Zhang, Oscar Tackstrom, et al. 2013. Universal dependency annotation for multilingual parsing. In Proceedings of the 51st Annual Meeting of the Association for Computational Linguistics (vol. 2: Short Papers) , pp. 92-97.

Samuel Bowman, Luke Vilnis, Oriol Vinyals, Andrew Dai, Rafal Jozefowicz, and Samy Bengio. 2016. Generating sentences from a continuous space. In Proceedings of The 20th SIGNLL Conference on Computational Natural Language Learning , pp. 10-21.

Sharma et al. "Attend and attack: Attention guided adversarial attacks on visual question answering models." Proc. Conf. Neural Inf. Process. Syst. Workshop Secur. Mach. Learn. 2018.

Sutton, Richard S. "Comparing Policy-Gradient Algorithms", 2001.

Sutton, Richard S. "Reinforcement Learning", 1999.

Taesun Moon, Parul Awasthy, Jian Ni, and Radu Florian. 2019. Towards lingua franca named entity recognition with bert.

Tang et al. "Semantic Equivalent Adversarial Data Augmentation for Visual Question Answering." arXiv preprint arXiv:2007.09592 (2020).

Telmo Pires, Eva Schlinger, and Dan Garrette. 2019. How multilingual is multilingual BERT? In Proceedings of the 57th Annual Meeting of the Association for Computational Linguistics , pp. 4996-5001, Florence, Italy. Association for Computational Linguistics.

Tom Kwiatkowski, Jennimaria Palomaki, Olivia Redfield, Michael Collins, Ankur Parikh, Chris Alberti, Danielle Epstein, Ilia Polosukhin, Matthew Kelcey, Jacob Devlin, Kenton Lee, Kristina N. Toutanova, Llion Jones, Ming-Wei Chang, Andrew Dai, Jakob Uszkoreit, Quoc Le, and Slav Petrov. 2019. Natural Questions: a benchmark for question answering research . TACL.

Wei Emma Zhang, Quan Z Sheng, and Ahoud Abdulrahmn F Alhazmi. 2019. Adversarial attacks on deep learning models in natural language processing: A survey. arXiv preprint arXiv:1901.06796.

Wei He, Kai Liu, Jing Liu, Yajuan Lyu, Shiqi Zhao, Xinyan Xiao, Yuan Liu, Yizhong Wang, Hua Wu, Qiaoqiao She, et al. 2017.

(56) References Cited

OTHER PUBLICATIONS

Dureader: a Chinese machine reading comprehension dataset from real-world applications. arXiv preprint arXiv:1711.05073.
Wei Wang, Ming Yan, and Chen Wu. 2018. Multigranularity hierarchical attention fusion networks for reading comprehension and question answering. ACL.
Williams, Ronald J. "Simple Statistical Gradient-Following Algorithms for Connectionist Reinforcement Learning", CCS Northeastern University, 1992.
Xiaozhi Wang , Xu Han, Yankai Lin, Zhiyuan Liu, Maosong Sun, Adversarial multi-lingual neural relation extraction, Proceedings of the 27th International Conference on Computational Linguistics, pp. 1156-1166, Santa Fe, New Mexico, USA, Aug. 20-26, 2018.
Yicheng Wang and Mohit Bansal. 2018. Robust machine comprehension models via adversarial training. NAACL.
Yiming Cui, Ting Liu, Wanxiang Che, Li Xiao, Zhipeng Chen, Wentao Ma, Shijin Wang, and Guoping Hu. 2019. A span-extraction dataset for Chinese machine reading comprehension . In Proceedings of the 2019 Conference on Empirical Methods in Natural Language Processing and the 9th International Joint Conference on Natural Language Processing (EMNLP-IJCNLP), pp. 5883-5889, Hong Kong, China. Association for Computational Linguistics.
Zhilin Yang, Peng Qi, Saizheng Zhang, Yoshua Bengio, William Cohen, Ruslan Salakhutdinov, and Christopher D. Manning. 2018. HotpotQA: A dataset for diverse, explainable multi-hop question answering . In Proceedings of the 2018 Conference on Empirical Methods in Natural Language Processing , pp. 2369-2380, Brussels, Belgium. Association for Computational Linguistics.
Zhilin Yang, Zihang Dai, Yiming Yang, Jaime G. Carbonell, Ruslan Salakhutdinov, and Quoc V. Le. 2019a. XLNet: Generalized autoregressive pretraining for language understanding . CoRR , abs/1906.08237.
Ziqing Yang, Yiming Cui, Wanxiang Che, Ting Liu, Shijin Wang, and Guoping Hu. 2019b. Improving machine reading comprehension via adversarial training. arXiv preprint arXiv:1911.03614.
Yicheng Wang et al., "Robust Machine Comprehension Models via Adversarial Training", arXiv:1804.06473, 2018.
P. Mell et al., "The NIST Definition of Cloud Computing", National Institute of Standards and Technology, Information Technology Laboratory, Sep. 2011, pp. 1-7.
Ian Goodfellow, Jean Pouget-Abadie, Mehdi Mirza, Bing Xu, David Warde-Fariey, Sherjil Ozair, Aaron Courville, and Yoshua Bengio. 2014. Generative adversarial nets . In Z. Ghahramani, M. Welling, C. Cortes, N. D. Lawrence, and K. Q. Weinberger, editors, Advances in Neural Information Processing Systems 27 , pp. 2672-2680. Curran Associates, Inc.
PCT International Search Report for PCT/CN2021/115391, Related to P202005671US01, U.S. Appl. No. 17/076,031; dated Nov. 20, 2021.

* cited by examiner

TRAINING A QUESTION-ANSWER DIALOG SYTEM TO AVOID ADVERSARIAL ATTACKS

BACKGROUND

The present invention relates to the field of question-answer dialog systems used to answer questions. Still more specifically, the present invention relates to the field of protecting question-answer dialog systems from adversarial attacks that corrupt such question-answer dialog systems.

SUMMARY

In one or more embodiments of the present invention, a method protects a question-answer dialog system from being attacked by adversarial statements that incorrectly answer a question. A computing device accesses a plurality of adversarial statements that are capable of making an adversarial attack on the question-answer dialog system, which is trained to provide a correct answer to a specific type of question. The computing device utilizes the plurality of adversarial statements to train a machine learning model for the question-answer dialog system. The computing device then reinforces the trained machine learning model by bootstrapping adversarial policies that identify multiple types of adversarial statements onto the trained machine learning model. The computing device then utilizes the trained and bootstrapped machine learning model to avoid adversarial attacks when responding to questions submitted to the question-answer dialog system.

In one or more embodiments of the present invention, the trained and bootstrapped machine learning model is tested by the computing device: converting a question for the question-answer dialog system into a statement with a placeholder for an answer; picking randomly an answer entity from the answer and adding the randomly picked answer entity in place of the placeholder to generate an adversarial statement; generating an attack on the trained and bootstrapped machine learning model with the adversarial statement; measuring a response to the generated attack from the trained and bootstrapped machine learning model; and modifying the trained and bootstrapped machine learning model in order to increase a response level of the response to the generated attack.

In one or more embodiments of the present invention, the context passage includes a correct answer which includes a correct answer entity, the specific type of question includes a specific type of question entity, and the method further includes the computing device: generating/retrieving a Random Answer Random Question (RARQ) adversarial statement, where the RARQ adversarial statement comprises a random answer entity that replaces the correct answer entity in the correct answer, and where the RARQ adversarial statement comprises a random question entity that replaces the correct question entity in the correct answer; generating/retrieving a Random Answer Original Question (RAOQ) adversarial statement, where the RAOQ adversarial statement comprises a random answer entity that replaces the correct answer entity in the correct answer, and where the RAOQ adversarial statement includes the correct question entity from the correct answer; generating/retrieving a No Answer Random Question (NARQ) adversarial statement, where the NARQ adversarial statement replaces the correct answer entity in the correct answer with no answer, and where the NARQ adversarial statement comprises a random question entity that replaces the correct question entity in the correct answer; generating/retrieving a No Answer Original Question (NAOQ) adversarial statement, where the NAOQ adversarial statement replaces the correct answer entity in the correct answer with no answer, and where the NAOQ adversarial statement comprises the correct question entity from the correct answer; and utilizing the RARQ adversarial statement, RAOQ adversarial statement, NARQ adversarial statement, and NAOQ adversarial statement as inputs to further train the machine learning model for the question-answer dialog system to recognize adversarial statements.

In one or more embodiments of the present invention, the original question used in the question-answer dialog system, the original context passage used in the question-answer dialog system, and/or the adversarial statements generated for the question-answer dialog system are in one or more different languages, such that the question-answer dialog system is capable of handling adversarial attacks in multiple languages.

In one or more embodiments, the method(s) described herein are performed by an execution of a computer program product and/or a computer system.

DETAILED DESCRIPTION

Figure 1:
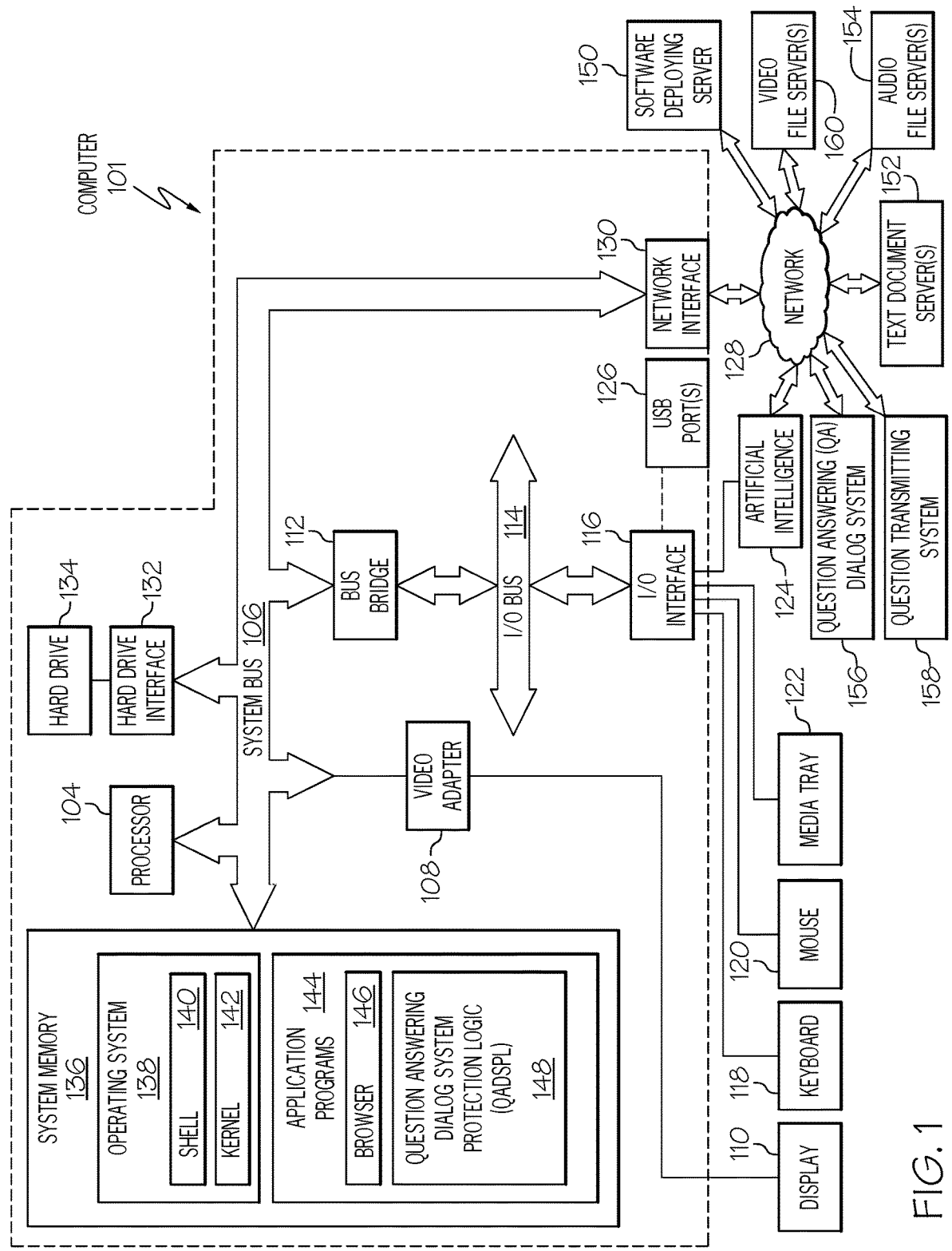
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 101 can be utilized by artificial intelligence 124 and/or software deploying server 150 and/or text document server(s) 152 and/or audio file server(s) 154 and/or question-answer dialog system 156 and/or question transmitting system 158 and/or video file server(s) 160 shown in FIG. 1, and/or controller 601 shown in FIG. 6, and/or multilingual bidirectional encoder representation from transformers (e.g. MBERT) system 724 shown in FIG. 7, and/or one or more of the neurons/nodes shown in the deep neural network 924 depicted in FIG. 9.

Exemplary computer 101 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 101 is also able to communicate with artificial intelligence 124 and/or software deploying server 150 and/or text document server(s) 152 and/or audio file server(s) 154 and/or question-answer dialog system 156 and/or question transmitting system 158 and/or video file server(s) 160 using a network interface 130 to a network 128. Network interface 130 is a hardware network interface, such as a network interface card (NIC), etc. Network 128 can be an external network such as the Internet, or an internal network such as an Ethernet or a virtual private network (VPN). One or more examples of physical device 154 are presented below.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 101. This volatile memory includes additional higher levels of volatile memory (not shown), including, but not limited to, cache memory, registers and buffers. Data that populates system memory 136 includes computer 101's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 101) to send and receive network messages to the Internet using hypertext transfer protocol (HTTP) messaging, thus enabling communication with software deploying server 150 and other computer systems.

Application programs 144 in computer 101's system memory (as well as software deploying server 150's system memory) also include a question answering dialog system protection logic (QADSPL) 148. QADSPL 148 includes code for implementing the processes described below, including those described in FIGS. 2-10. In one embodiment, computer 101 is able to download QADSPL 148 from software deploying server 150, including in an on-demand basis, wherein the code in QADSPL 148 is not downloaded until needed for execution. Note further that, in one embodiment of the present invention, software deploying server 150 performs all of the functions associated with the present invention (including execution of QADSPL 148), thus freeing computer 101 from having to use its own internal computing resources to execute QADSPL 148.

Text document server(s) 152 are servers that send context (i.e., text passages such as those shown in FIG. 3) to computer 101, AI 124, and/or QA question-answer dialog system 156 by matching a particular type of question (received by computer 101, AI 124, and/or QA question-answer dialog system 156) to a particular set of candidate answer texts.

Audio file server(s) 154 are servers that send context (i.e., audio files) to computer 101, AI 124, and/or QA question-answer dialog system 156 by matching a particular type of question (received by computer 101, AI 124, and/or QA question-answer dialog system 156) to a particular set of candidate answer audio files. That is, audio file server(s) 154 interpret the type of question that is received, and they return a related audio file (e.g., as identified by metadata that describes each audio file) whose subject matter matches that type of question. For example, if the question is about a particular type of music, then the audio file server(s) 154 will return audio files having a metatag describing that particular type of music.

QA Dialog System 156 is a system that responds to questions (e.g., from a question transmitting system 158) with an answer, utilizing the processes/systems described herein.

Video file server(s) 160 are servers that send context (i.e., video files) to computer 101, AI 124, and/or QA question-answer dialog system 156 by matching a particular type of question (received by computer 101, AI 124, and/or QA question-answer dialog system 156) to a particular set of candidate answer video files. That is, video file server(s) 160 interpret the type of question that is received, and they return a related video file (e.g., as identified by metadata that describes each video file) whose subject matter matches that type of question. For example, if the question is about a particular type of visual art, then the video file server(s) 160 will return video files having a metatag describing that particular type of visual art.

Note that the hardware elements depicted in computer 101 are not intended to be exhaustive, but rather are representative to highlight essential components required by the present invention. For instance, computer 101 can include alternate memory storage devices such as magnetic cassettes, digital versatile disks (DVDs), Bernoulli cartridges, and the like. These and other variations are intended to be within the spirit and scope of the present invention.

Question Answering (QA) systems, also referred to as Question-Answer dialog systems, are an important tool used by people seeking answers. An exemplary QA system receives questions (e.g., "What is the oldest café in Paris?"), searches through a corpus of text, video, audio, etc. resources, and returns the correct answer (e.g., "Café X").

As such, it is preferable that such QA systems be robust to ensure they can provide correct answers to the users. That is, a QA system is weak if it fails against malicious attacks (discussed in detail below), and is robust if it can successfully defend against malicious attacks (as described and claimed in one or more embodiments of the present invention).

Thus, one or more embodiments of the present invention provide a robust QA system that not only defends itself against malicious attacks, but also is able to handle multilingual malicious attacks.

As described herein, one or more embodiments of the present invention utilize one or more new types of adversarial statements to expose weaknesses in multilingual question answer (MLQA) systems.

These new types of adversarial statements are used to train a QA model, thus making the trained QA model more robust in fighting off malicious attacks.

In one or more embodiments of the present invention, the trained QA model is reinforced by bootstrapping adversarial policies (e.g., policies that describe which of the new types of adversarial types are to be monitored for), thereby creating an even more effective QA model for training a MLQA system.

Thus, in one or more embodiments of the present invention, a method/apparatus generates attack statements in any language for an MLQA system by: converting an original question to a general statement by using a placeholder for the answer; randomly picking various entities to replace the question entity and/or answer entity found in the original question, in order to create adversarial statements; randomly adding the adversarial statements to the context to attack the MLQA system; training the MLQA system with data that has the adversarial statements in addition to the original data; reinforcing the trained MLQA model by bootstrapping adversarial policies (i.e., appending policies regarding how to handle the adversarial statements) to the trained MLQA; and then using the trained MLQA with the bootstrapped adversarial policies to answer questions that are similar in meaning to the reinforced trained MLQA model.

Recent advances in open domain question answering (QA) systems have mostly revolved around machine reading comprehension (MRC), where the task is to read and comprehend a given text and then answer questions based on it. Much credit in the prior art for obtaining the state-of-the-art (SOTA) on English MRC datasets is due to the invention of large pre-trained language models (LM). Much less attention has been paid in the prior art to multi-lingual question answering.

As such, one or more embodiments of the present invention focus on a Multi-lingual QA (MLQA) system. More specifically, one or more embodiments of the present invention address the problem of adversarial attacks on a MLQA dataset (i.e., context/passages used by the MLQA system to answer questions) by using novel multilingual adversarial statements to train the MLQA system on how to recognize multilingual attacks through the use of a robust MLQA model.

In one or more embodiments of the present invention, multilingual QA models are trained with multilanguage bidirectional encoder representation from transformers (e.g., MBERT), which uses transformers, as described in example detail below in FIG. 7. A transformer is a logical mechanism that reads an entire sequence of words from a passage without being constrained by reading from left-to-right or right-to-left. That is, a transformer is defined as a logic that identifies how various words are related to one another, as described below in Step 1 (element 402) and Step 2 (element 404) of flowchart 400 shown in FIG. 4.

As described below in FIG. 4, the question is converted into a corresponding statement with a placeholder for the answer, which is then used to create adversarial statements, which "look" like the correct answer (due to similar terms, passages, found in the correct answer), but in fact are not. These adversarial statements, which in one or more embodiments of the present invention include translations of the adversarial statements that have been translated into one or more different languages, are used to attack the existing multilingual QA model and train a new multilingual QA model.

Once the trained multilingual QA model is built, it is used by an artificial intelligence system to recognize and block adversarial attacks (which contain adversarial statements) from being returned to a questioner who is using the QA system.

Figure 2:
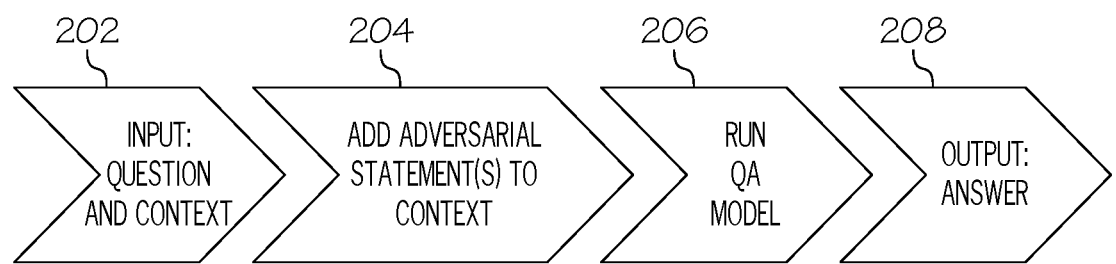
FIG. 2 illustrates a high-level overview of an example attack pipeline that is used when running a question answering (QA) dialog/learning system that has adversarial statements in the context passages according to one or more embodiments of the present invention.

With reference now to FIG. 2, a high-level overview of an example attack pipeline that is used when training a question-answer learning system to recognize adversarial statements in context passages according to one or more embodiments of the present invention is presented.

As shown in FIG. 2, an original question and an original context (e.g., text passage, video file, etc.) that answers the original question is input to a holding section of a question/answer (QA) system (e.g., QA dialog system 156 shown in FIG. 1), as shown in block 202. If the question and context are both text, they are in any language in one or more embodiments of the present invention.

As shown in block 204, one or more adversarial statements, which are new statements that contradict the information found in the original context/passage/answer, are added to the original context/passage/answer.

In one or more embodiments of the present invention, these adversarial statements, which are patterned on the original question and yet are in conflict with the information in the original context/passage/answer, are in languages that are different from that used in the original question and/or the original context/passage/answer.

In one or more embodiments of the present invention, these adversarial statements are in the same language as that of the original question and/or original context/passage/answer.

In one or more embodiments of the present invention, and as described in detail below, these adversarial statements are of the form of a random answer random question (RARQ) adversarial statement, a random answer original question (RAOQ) adversarial statement, a no answer random question (NARQ) adversarial statement, and/or a no answer original question (NAOQ) adversarial statement, as described in detail below in FIG. 3 and FIG. 4.

As shown in block 206 of FIG. 2, the original contexts with the added adversarial statement(s) are then run against a question/answer (QA) model on an artificial intelligence (AI) system. That is, the original contexts with the added adversarial statement(s) are used as inputs to an AI system that has been trained by a question/answer (QA) model to match a particular type of question (which matches parameters, terms, context, etc. of the original question) with a particular type of context/passage/answer (which matches parameters, terms, etc. of the original context/passage/answer).

However, at this point, the system has not been trained to recognize the adversarial statement(s) added in block 204, and thus the output answer shown in block 208 can contain erroneous information caused by the adversarial statement(s) added in block 204.

Figure 3:
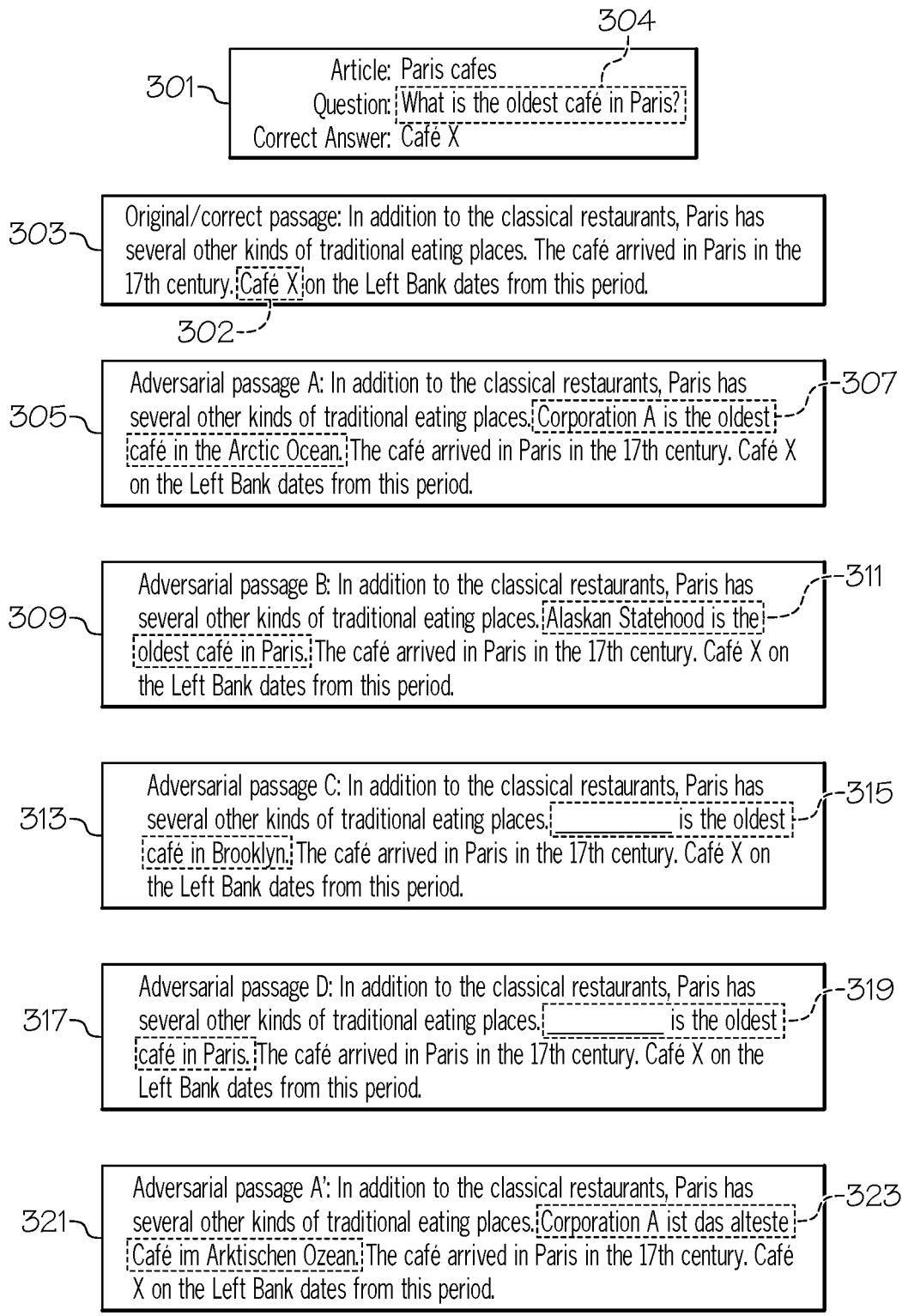
FIG. 3 depicts different types of adversarial passages used in one or more embodiments of the present invention.

With reference now to FIG. 3, different types of adversarial passages used in one or more embodiments of the present invention are depicted.

As shown in block 301, assume that the topic of a query is about the article "Paris cafes". Assume further that the original question 304 being presented to the QA system is "What is the oldest café in Paris?". The correct/original answer to this original question is "Café X", which was derived from the original/correct passage/context shown in block 303, and is located at location 302 in block 303. For example, in this example, location 302 is the location of the 25$^{th}$ word in the original/correct passage/context shown in block 303.

However, the original/correct passage/context shown in block 303 can be modified using adversarial statements, such as those shown in adversarial passage A (block 305), adversarial passage B (block 309), adversarial passage C (block 313), and adversarial passage D (block 317).

The adversarial statement that is added to the adversarial passage is created by converting the question into a statement with a placeholder for an answer. The statement can be modified using one of the attack approaches as described below as shown in FIG. 3.

Thus, and with regard to FIG. 3, adversarial passage A, shown in block 305, includes a random answer random question (RARQ) adversarial statement 307, in which a random answer entity ("Corporation A") is included in the adversarial statement, and a random question entity ("Arctic Ocean") replaces the correct question entity ("Paris") in the adversarial statement shown in blocks 301/303.

Adversarial passage B, shown in block 309, includes a random answer original question (RAOQ) adversarial statement 311, in which a random answer entity ("Alaskan Statehood") is included in the adversarial statement, and the specific type of question entity ("Paris") from the correct answer shown in blocks 301/303 remains the same.

Adversarial passage C, shown in block 313, includes a no answer random question (NARQ) adversarial statement 315, in which no answer entity is added (referred to as "_____", to illustrate that no word is there), and a random question entity ("Brooklyn") replaces the correct question entity ("Paris") found in the correct answer shown in blocks 301/303.

Adversarial passage D, shown in block 317, includes a no answer original question (NAOQ) adversarial statement 319, in which no answer entity is added (referred to as "_____", to illustrate that no word is there), and the correct question entity ("Paris") from the correct answer shown in blocks 301/303 remains the same.

As stated above in the discussion of block 204 in FIG. 2, in one or more embodiments of the present invention the adversarial statements are in languages other than that of the original question and/or original context/passage/answer. Such adversarial statements in other languages are the result of a foreign language passage being retrieved by the QA system, or by the QA system translating one of the adversarial statements discussed above. In either embodiment, block 321 shown adversarial passage A', in which the RARQ adversarial statement 307 ("Corporation A is the oldest café in the Arctic Ocean.") is translated into a German adversarial statement 323 ("Corporation A ist das älteste Café in Arktischen Ozean.") and inserted into the original/correct passage shown in block 303.

Figure 4:
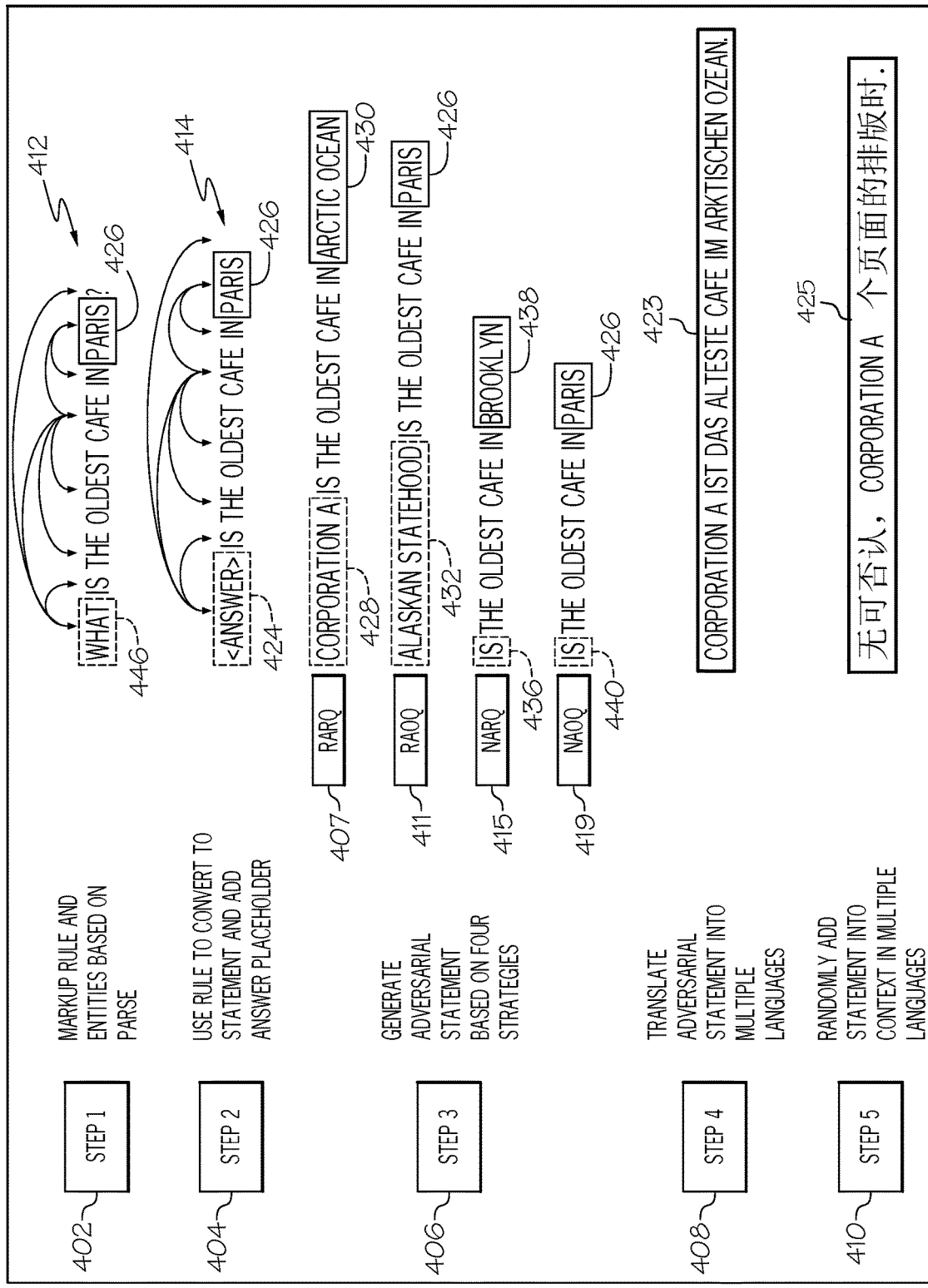
FIG. 4 illustrates an exemplary flow of steps used for generating adversarial statements in one or more embodiments of the present invention.

With reference now to FIG. 4, an exemplary flowchart 400 of steps used for generating the example adversarial statements shown in FIG. 3, in accordance with one or more embodiments of the present invention, is presented.

As shown in block 402, in one or more embodiments of the present invention, Step 1 runs linguistic preprocessing steps on question 412 ("What is the oldest café in Paris?"), which is also shown in block 301 in FIG. 3. These example linguistic preprocessing steps include: 1) universal dependency parsing (UDP), and 2) named entity recognition (NER). Using markup rules and parsing, Step 1 identifies a root term (e.g., element 446), which broadly identifies the type of question ("what") being asked, as well as the tagged question entity 426 (location, e.g., Paris). That is, this analysis identifies, in the question 412, the focus words (e.g. which, what etc.) using their corresponding part of speech (POS) tags (e.g. wrb for an adverb such as "where" and vb for a verb such as "is") are generated by the parser. This analysis leads to a depth-first search on the parse and marks all POS tokens that are on the same level or a child of the focus word as part of the question rule. This approach creates thousands of patterns in a question answering dataset used as a training set, some occurring only once. Some example patterns include "what nn", "what vb", "who vb", "how many", and "what vb vb".

In addition, and in one or more embodiments of the present invention, the system marks up all the entities (e.g., words) in the question 412.

In one or more embodiments of the present invention, priority is given to entities tagged by the NER that are not part of the question pattern. However, when such entities are not found, the system preferably will look at nouns and then verbs to ensure better coverage.

Thus, in the example shown in FIG. 4, "what vb" is the pattern found in "What is the oldest cafe in Paris?".

As shown in block 404, in one or more embodiments of the present invention, Step 2 converts the question 412 into the statement 414.

In one or more embodiments of the present invention, the pattern found in Step 1 is used to choose from multiple rules based on the common question words: {"who", "what", "when", "why", "which", "where", "how"} and a catchall for any pattern that does not have question words (these are usually due to ill-formed questions or misspellings such as "Mr. Smith's grandmother's name was?"). The rule converts the question 412 ("What is the oldest café in Paris?") into the statement 414 ("<ANSWER> is the oldest café in Paris"), which contains the tagged question entity 426 ("Paris") and adds a placeholder 424 (<ANSWER>) in place of root term "What is" (element 446).

If the first question word found in the pattern is "what", the rule "what vb" will replace "what" with <ANSWER>, such as "<ANSWER> is the oldest cafe in Paris", as shown in statement 414. Sometimes, the answer is added to the end of the statement. The "when vb vb" pattern will trigger the rule for "when" which converts "When did Rock Band ABC release their second album?" to "Rock Band ABC released their second album in <ANSWER>".

As shown in block 406, in one or more embodiments of the present invention, Step 3 generates one or more adversarial statements based on different strategies. In the exemplary embodiment shown in FIG. 4, given the question 412 and the statement 414, exemplary attack statement RARQ 407 (analogous to adversarial statement 307 shown in FIG. 3), attack statement RAOQ 411 (analogous to adversarial statement 311 shown in FIG. 3), attack statement NARQ 415 (analogous to adversarial statement 315 shown in FIG. 3), and attack statement NAOQ 419 (analogous to adversarial statement 319 shown in FIG. 3) are generated.

As shown in FIG. 4, RARQ 407, RAOQ 411, NARQ 415, and NAOQ 419 are generated to replace <ANSWER> and/or question entities based on the attack. In one or more embodiments of the present invention, the candidate entities are randomly chosen from the entities found in the question answer dataset training data based on their type. The type of the answer entity is chosen based on the entity that the system predicts for the development/test question in a non-adversarial setting.

In one or more embodiments of the present invention, date and number entities are not chosen from the question answer dataset training data, but rather are just randomly generated.

The candidate entities are applied to create the adversarial statement using the following transformations from most complex to most simple.

RARQ 407, which is a random answer random question adversarial/attack statement, has a random answer entity 428 ("Corporation A") that replaces placeholder 424 (<ANSWER>), and its question entity 430 ("Arctic Ocean") is randomly changed from the tagged question entity 426 ("Paris") found in statement 414. Note that "Corporation A" is an incorrect answer to question 412, which is intentional, since RARQ 407 will be used to train the QA system on how to recognize RARQ attacks/adversarial statements.

RAOQ 411, which is a random answer original question attack/adversarial statement, has a random answer entity 432 ("Alaskan Statehood"), but its question entity 426 ("Paris") is the same question entity 426 found in statement 414. Note that RAOQ 411 is also an incorrect statement, which will be used to train the QA system on how to recognize RARQ attacks/adversarial statements.

NARQ 415, which is a no answer random question attack/adversarial statement, has no answer entity in section 436, and has a randomly generated question entity 438 ("Brooklyn"). Note that NARQ 415 is also an incorrect statement, which will be used to train the QA system on how to recognize RARQ attacks/adversarial statements.

NAOQ 419, which is a no answer original question attack/adversarial statement, has no answer entity in section 440, but includes the question entity 426 ("Paris") found in the statement 414. Note that NAOQ 419 is also an incorrect statement, which will be used to train the QA system on how to recognize NAOQ attacks/adversarial statements.

As shown in block 408, Step 4 translates one or more of the attack/adversarial statements created in Step 3 into another language. That is, in one or more embodiments of the present invention, the attack/adversarial statements created in Step 3 are initially generated using the same language as that used by a question (e.g., English). Since the QA system will be evaluating a multilingual dataset and model, these attack/adversarial statements are then translated into multiple other languages by the QA system, if not already in another language when sent from the text document server(s) 152 shown in FIG. 1.

For example, the RARQ 407 attack/adversarial statement is translated into German, in order to create RARQ 423 (analogous to the German adversarial statement 323 shown in FIG. 3).

As shown in block 410, Step 5 then randomly inserts the attack/adversarial statements created in Step 3 and/or Step 4 into the context (e.g., the original/correct passage/context shown in block 303 in FIG. 3) to create the adversarial passages A, B, C, D, and A' shown in FIG. 3. That is, the generated adversarial statements (e.g., RARQ 407, RAOQ 411, NARQ 415, NAOQ 419, RARQ 423, etc.) are inserted in random positions in a context, such as the original/correct passage shown in block 303 in FIG. 3, which is shown in FIG. 4 as adversarial passage 425. This produces a new instance (Qx, Cy, Ay, Sz) where x, y, z ∈ L are the languages for the question, context, and statement respectively and they need not be the same, as shown in blocks 305, 309, 313, 317, and 321 in FIG. 3.

The attack/adversarial statements described above allow the QA system to explore the brittleness of the MLQA dataset and MBERT by forcing it to predict the wrong answer in not just one but multiple languages, such that the question, context, and adversarial statement can all be in the same or different languages.

Figure 5:
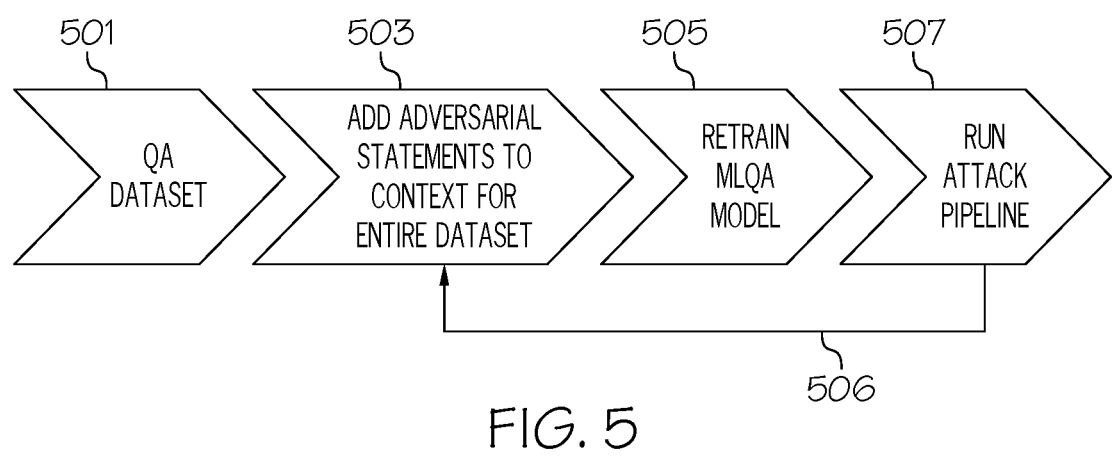
FIG. 5 depicts an example process for using a trained model to defend against adversarial statements/attacks in a question-answer dialog system, in accordance with one or more embodiments of the present invention.

Thus, and with reference now to FIG. 5, an example process for using a trained model to defend against adversarial attacks/statements in a question-answer dialog system, in accordance with one or more embodiments of the present invention, is presented.

As shown in block 501, the process begins by retrieving a question/answer (QA) dataset of known questions and their known correct answers (e.g., question-answer pairs such as that shown in block 301 in FIG. 3).

As shown in block 503 in FIG. 5, attack/adversarial statements of multiple types (e.g., RARQ, RAOQ, NARQ, and/or NAOQ) and/or in multiple languages are added to the context/passages for the entire training dataset (of question-answer pairs), as described in FIG. 4.

As discussed above when describing FIG. 4, a QA model has been created by converting question 412 into statement 414, and then correlating question 412 with statement 414. As described in block 505 in FIG. 5, this QA model is then modified to create a multilingual QA (MLQA) model. In one or more embodiments of the present invention, the MLQA model is created in two steps.

The first step is to intentionally pollute/populate the passage 303 with one or more of the attack/adversarial statements in multiple languages, as described in FIG. 4, in order to create additional learning data for the MLQA model.

Further, a passage can be populated with one or more adversarial statements several times using the same or different attacks to create new passages as additional learning data for the MLQA model.

The original question/answer/passages and the new question/answer/passages created in FIG. 4 are used to retrain the original MLQA model as described in FIG. 5.

The second step is to bootstrap adversarial policies to the version of the MLQA model retrained with the attacks (i.e., appending policies regarding how to handle the various attack/adversarial statements in different languages) to improve the retrained MLQA model. This retrained MLQA model is recursively trained using reinforcement learning, as shown in arrow block 506, by an artificial intelligence (AI) system.

As shown in block 507, during each iteration, the question/answer/passages with adversarial attacks is run through the retrained MLQA, which has multiple languages, to evaluate whether the newly retrained MLQA model is robust, i.e. impervious to attacks.

In one or more embodiments of the present invention, the process shown in block 503 and/or block 505 shown in FIG. 5 uses artificial intelligence, such as artificial intelligence 124 shown in FIG. 1. Such artificial intelligence 124 is in various forms, in accordance with one or more embodiments of the present invention. Such forms include, but are not limited to, a transformer-based reinforcement learning system that utilizes a multilanguage bidirectional encoder representation from transformers (MBERT), a deep neural network (DNN), a recursive neural network (RNN), a convolutional neural network (CNN), etc.

Figure 7:
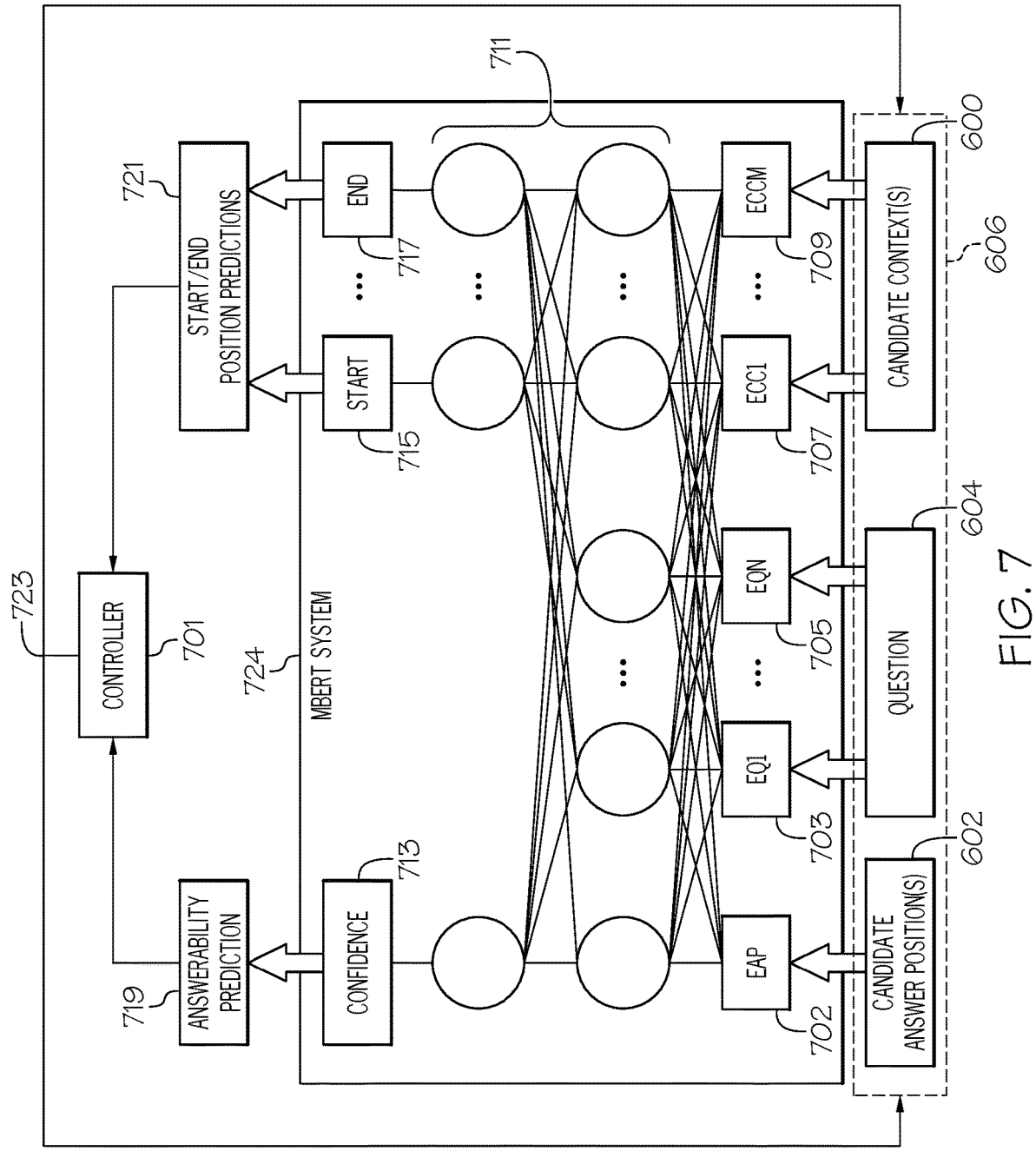
FIG. 7 depicts an exemplary embodiment of the transformer model system shown in FIG. 6 using a multilanguage bidirectional encoder representation from transformers (e.g. MBERT) in accordance with one or more embodiments of the present invention.

Thus, and in one or more embodiments of the present invention, the MBERT system described below in FIG. 7 is a transformer-based system to be used with reinforced learning as shown in FIG. 5. That is, a combination of transformers and reinforced learning enable the system to determine which bootstrapped adversarial policies to use in deciding to 1) create the RAOQ adversarial statements, NAOQ adversarial statements, etc. described in FIG. 3 and FIG. 4 from a context, such as the example passage shown in block 303 in FIG. 3; 2) translate a question such as the example question 412 shown in FIG. 4 into another language; 3) and/or translate an answer such as the example statement 414 shown in FIG. 4 into another language.

That is, in a reinforcement learning setup in one or more embodiments of the present invention, the system (e.g., QA dialog system 156 shown in FIG. 1) finds the best combination of one or more adversarial policies via a policy gradient algorithm, such as the REINFORCE algorithm (discussed below), and then applies those policy(s) on a large pool of adversarial statements, translations, etc. used to train the defense of the system that can be newly created during each iteration.

As described herein, in one or more embodiments of the present invention a candidate context (e.g., one or more of the contexts/passages shown in blocks 303, 305, 309, 313, 317, 321 in FIG. 3) is evaluated to determine a location of a correct answer within such contexts/passages, even though they have possibly been corrupted with adversarial states (e.g., elements 307, 311, 315, 319, 323 shown in FIG. 3).

Figure 6:
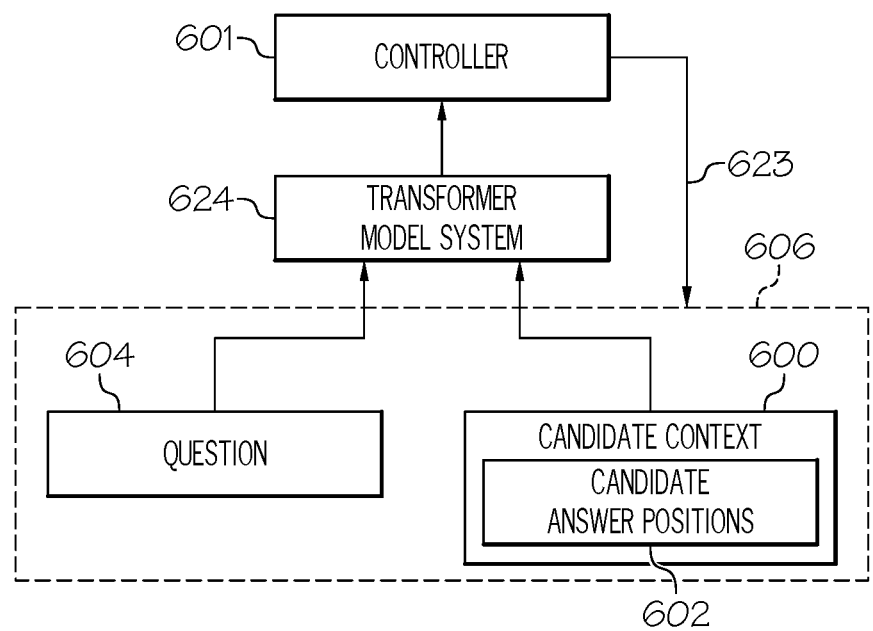
FIG. 6 illustrates a high-level overview of recursive training of a transformer model system in accordance with one or more embodiments of the present invention.

With reference now to FIG. 6, a high-level overview of one or more embodiments of the present invention is presented.

A transformer model system 624 (i.e., a system that models contexts through the use of transformers, as described herein), analogous to AI 124 shown in FIG. 1, receives a question 604 (analogous to question 304 shown in FIG. 3) and a candidate context 600 (analogous to some or all of the contexts shown in blocks 303, 305, 309, 313, 317, 321 in FIG. 3) as inputs. Candidate context 600 also has candidate answer positions 602, which show where within the candidate context 600 the candidate context 600 is predicted to hold a correct answer to the question 604. The transformer model system 624 uses these different answer positions 602 to train the transformer model system 624 on how to accurately identify the correct answer location from the candidate answer positions 602. As shown by block 604, in one or more embodiments of the present invention the question 604, candidate context 600, and candidate answer positions 602 are combined into a single group. Whether or not question 604, candidate context 600, and candidate answer positions 602 are combined into a single group, in one or more embodiments of the present invention the controller 601 (e.g., computer 101 shown in FIG. 1) sends different questions, candidate contexts, and/or candidate answer positions to the transformer model system 624, in order to train the transformer model system 624 and/or to evaluate different questions, candidate contexts, and/or candidate answer positions.

With reference now to FIG. 7, an exemplary multilanguage bidirectional encoder representation from transformers (MBERT) system 724 as used in one or more embodiments of the present invention is presented.

MBERT system 724 (i.e., a training system that uses artificial intelligence to identify a location of a correct answer term within a context/passage, including a context/passage that has been corrupted by an adversarial statement as shown in FIG. 3 and FIG. 4) uses the candidate context(s) 600, candidate answer position(s) 602, and question 604 described in FIG. 6 as inputs. These inputs are transformed into embeddings (vectors). The embedding Eap (element 702) for candidate answer position 602 describes candidate positions for a correct answer within the candidate context 600. Embeddings Eq1-Eqn (elements 703 through 705) are different vectors that represent the terms in the question 604. Embeddings Ecc1-Eccm (elements 707 through 709) are different vectors that represent the terms in the candidate context 600.

The nodes 711 (i.e., artificial intelligence computational nodes) then use weights, algorithms, biases, etc. (similar to those described in block 911 for deep neural network 924 shown below in FIG. 9) to evaluate the candidate answer position 602 as being a correct position in the candidate context 600 for providing a correct answer to question 604.

The nodes 711 output their level of confidence 713 that a location within the candidate context 600, starting a start position 715 and ending at end location 717, is accurate. This confidence 713 is output as an answerability prediction 719 (i.e., a level of confidence that a particular start/end position contains the answer to question 604), as shown in start/end position predictions 721. The answerability prediction 719 and start/end position predictions 721 are then sent to the controller 701.

The lines 723 show that the controller 701 then uses a different candidate context/question/answer positions from the candidate context(s)/questions/answer positions to be trained by the MBERT system 724, as indicated by line 723 going to block 604. As in FIG. 6, these different candidate answer positions, questions, and/or candidate contexts can be entered into the MBERT system 724 collectively and/or individually, in accordance with one or more embodiments of the present invention.

Figure 8:
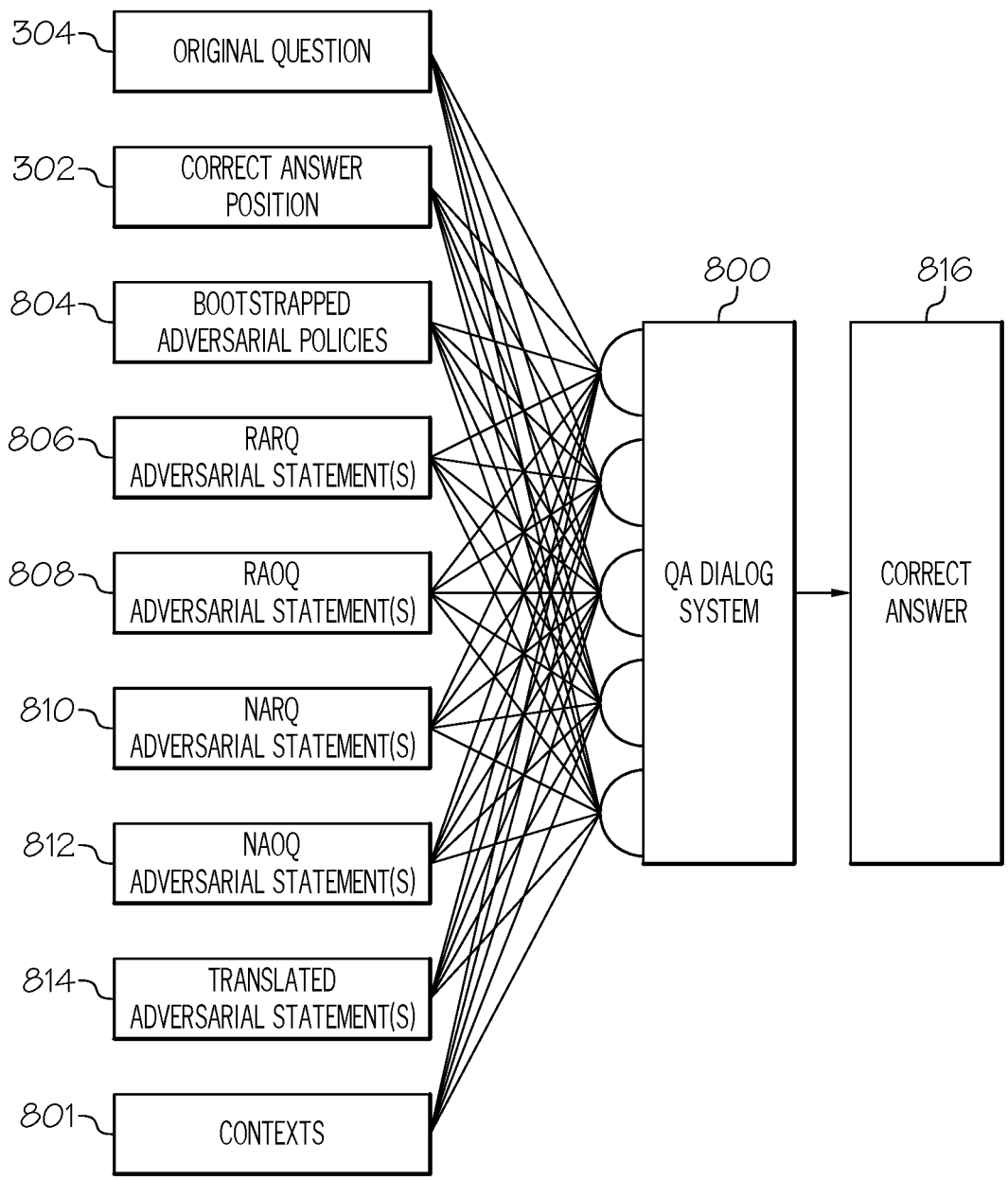
FIG. 8 illustrates an exemplary question answering dialog system as utilized in one or more embodiments of the present invention.

With reference now to FIG. 8, a QA dialog system 800, which utilizes a transformer-based system to answer questions with a correct answer 816 from candidate contexts 801 (e.g., one or more of the passages shown in FIG. 3) is shown.

In one or more embodiments of the present invention, transformers (such as those used by MBERT discussed herein) combine a token (e.g., a word in a sentence) with a position identifier of a position of the token within the sentence and a sentence identifier of the sentence to create an embedding. These embeddings are used to answer questions in the given context where the given context may or may not have adversarial statements.

A reinforcement system (e.g., REINFORCE, which uses a gradient such as a Monte-Carlo policy gradient) then allows the system to learn which policies are productive in the MLQA model understanding when a statement is an adversarial attack.

Assume that there are multiple bootstrapped adversarial policies 804 available to the transformer-based reinforcement learning system 802 for understanding adversarial statements (e.g., the example adversarial statements shown above in FIG. 4). The transformer-based reinforcement system (e.g., QA dialog system 800) then uses a gradient-based algorithm, such as the REINFORCE algorithm, which applies various adversarial policies from the bootstrapped adversarial policies 804 and the answer position 302 until the appropriate adversarial statement(s) (e.g., RARQ adversarial statement 806 and/or its corresponding translated adversarial statement(s) 814, which are determined by comparison to real-world types of adversarial statements that attack the QA dialog system 156 shown in FIG. 1, are no longer considered as being optimal training statements. For example, if the question statement "Café X is the oldest café in Paris" is converted into adversarial statement(s) (e.g., the RARQ adversarial statement "Corporation A is the oldest café in the Arctic Ocean") and/or its translated adversarial statement(s) ("Corporation A ist das alteste Café im Arktischen Ozean"), one or both of which are shown match up to the type of adversarial statements that actually (or are predicted to) attack the QA dialog system 156, then these adversarial statement(s) and/or translated adversarial statement(s) are sent to a controller (e.g., computer 101 shown in FIG. 1) to retrain the MLQA model (block 505 in FIG. 5) for running the attack pipeline (block 507 in FIG. 5).

In one or more embodiments of the present invention, transformer-based learning system (e.g., transformer model system 624 shown in FIG. 6) also translates the correct statement into another language (translated correct statement and/or original question), thus enabling the QA dialog system 156 to handle questions/statements in multiple languages, for use in executing the steps described in FIG. 4.

In one or more embodiments of the present invention, artificial intelligence 124 utilizes an electronic neural network architecture, other than the transformer-based system (e.g., transformer model system 624), such as that found in a deep neural network (DNN), a convolutional neural network (CNN), or a recursive neural network (RNN) with the reinforced learning system.

In a preferred embodiment, a deep neural network (DNN) is used to evaluate text/numeric data in a document from a text corpus received from text document server(s) 152 shown in FIG. 1, while a CNN is used to evaluate an image from an audio or image corpus (e.g., respectively from audio file server(s) 154 or video file server(s) 160 shown in FIG. 1).

A CNN is similar to a DNN in that both utilize interconnected electronic neurons. However, a CNN is different from a DNN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

An RNN is also similar to a DNN in that both utilize interconnected electronic neurons. However, an RNN is a much simpler architecture, in which child nodes feed into parent nodes using a weight matrix and a non-linearity (such as a trigonometry function), which are adjusted, until the parent node produces a desired vector.

Logic units within an electronic neural network (DNN or CNN or RNN) are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

In one or more embodiments of the present invention, a deep neural network is used to create a MLQA model for a question-answer dialog system.

With reference then to FIG. 7, a transformer (i.e., part of the MBERT system 724), which is a form of an exemplary deep neural network (DNN), is used to create and utilize a MLQA model when answering questions according to one or more embodiments of the present invention is presented.

For illustrative purposes, assume that inputs into the transformer/DNN include an original question 412 (e.g., "What is the oldest café in Paris?), and a correct answer position (e.g., the position in one or more of the candidate contexts for "Café X"). Such a DNN is able to use these inputs to create an initial QA model, by aligning answer entities (e.g., element 446 and element 424 shown in FIG. 4) and question entities (e.g., element 426 shown in FIG. 4).

As shown in FIG. 8, this DNN (shown as a QA dialog system 800) also contains algorithms, rules, etc. that use bootstrapped adversarial policies (e.g., policies that dictate how to recognize various types of attack/adversarial statements in a passage); RARQ adversarial statement(s) 806 (examples of which are described in FIG. 3 and FIG. 4); RAOQ adversarial statement(s) 808 (examples of which are described in FIG. 3 and FIG. 4); NARQ adversarial statement(s) 810 (examples of which are described in FIG. 3 and FIG. 4); NAOQ adversarial statement(s) 812 (examples of which are described in FIG. 3 and FIG. 4); as well as translations of these adversarial statement(s), (e.g., 423 shown in FIG. 4), shown as translated adversarial statement (s) 814 that are inputted into the contexts 801. That is, while it is to be understood that the RARQ adversarial statement(s) 806, RAOQ adversarial statement(s) 808, NARQ adversarial statement(s) 810, NAOQ adversarial statement(s) 812, and/or the translated adversarial statement(s) 814 are part of (incorporated into) contexts 801, they are shown in different boxes in FIG. 8 for purposes of clarity only.

The algorithms, rules, etc. used in the DNN/QA dialog system 800 are able to recursively define and refine the trained MLQA model.

Figure 9:
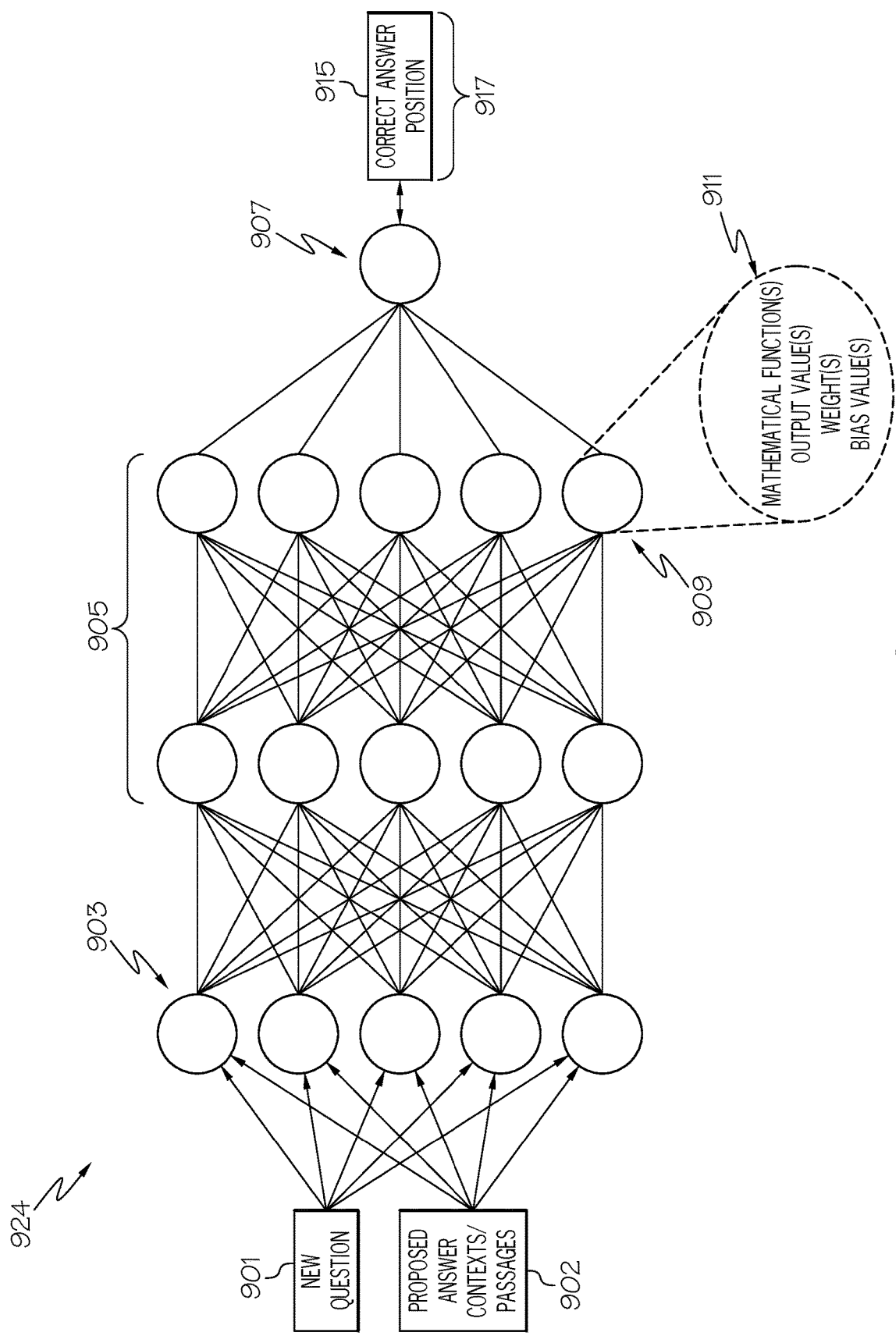
FIG. 9 depicts an exemplary deep neural network used by the QA dialog system 800 shown in FIG. 8 to respond to a new question in accordance with one or more embodiments of the present invention.

FIG. 9 depicts a high-level overview of an exemplary trained deep neural network (DNN) 924 that can be used to provide a correct answer position 915 in proposed answer contexts/passages 902 when responding to a new question 901.

When automatically adjusted, the mathematical functions, output values, weights, and/or biases are adjusted using "back propagation", in which a "gradient descent" method determines how each mathematical function, output value, weight, and/or bias should be adjusted in order to provide an output 917 that is accurate. That is, the mathematical function(s), output value(s), weight(s), and/or bias value(s) shown in block 911 for exemplary node 909 are recursively adjusted until the expected vector value for the trained MLQA model 915 is reached.

A new question 901 (e.g., "What is the oldest café in Madrid?"), along with proposed answer contexts/passages 902 (e.g., provided by a question/answer database, such as that described above) are also entered into the input layer 903, which process such information before passing it to middle layers 905. That is, using a similar process described above in FIG. 3-FIG. 5, one or more answer entities and one or more question entities in the new question 901 are used to retrieve an answer (similar to that described by statement 414) from a QA dataset, which is used to retrieve similar types of answers from contexts/passages. One or more of these contexts/passages are determined by DNN 924 to correctly answer the new question 1001, while adversarial statements are ignored.

As such, the elements mathematical function(s), output value(s), weight(s), bias value(s) shown in block 911, and found in one or more or all of the neurons in DNN 924, cause the output layer 907 to create the output 917, which includes a correct answer position 915 for the correct answer to the new question 901, including those answers found in passages containing adversarial statements for the new question 901.

In one or more embodiments of the present invention, the correct answer position 915 is then returned to the questioner.

As such, in one or more embodiments of the present invention, the present invention does not merely look for a particular known correct answer ("Café X") to a particular type of question ("What is the oldest café in Paris?") in a context/passage, but rather looks for a correct answer position of the correct answer for a particular type of question, thus providing a much more robust system than a mere word search program.

Figure 10:
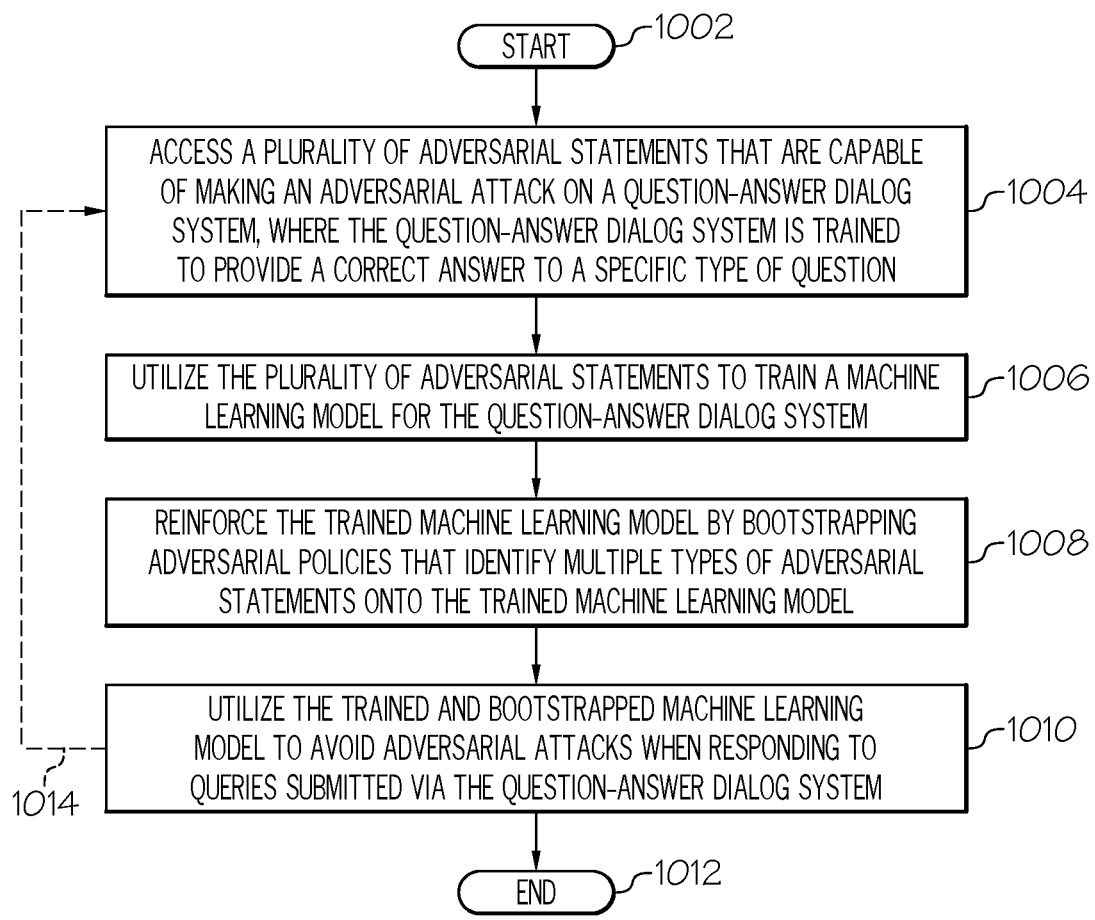
FIG. 10 illustrates a high-level flow chart of one or more steps performed by a method in accordance with one or more embodiments of the present invention.

With reference now to FIG. 10, a high-level flow chart of one or more steps performed in accordance with one or more embodiments of the present invention is presented.

After initiator block 1002, a computing device (e.g., computer 101 and/or artificial intelligence 124 and/or QA question-answer dialog system 156 shown in FIG. 1, implemented as an MBERT system 724 shown in FIG. 7, and/or a DNN) accesses a plurality of adversarial statements (e.g., elements 307, 311, 315, 319 shown in FIG. 3) that are capable of making an adversarial attack on a question-answer dialog system, as shown in block 1004. The question-answer dialog system (e.g., artificial intelligence 124 and/or QA question-answer dialog system 156) shown in FIG. 1 is a QA system that is designed/trained to provide a correct answer to a specific type of question, such as "What is the oldest café in a certain city?".

As shown in block 1006, the plurality of adversarial statements are utilized in training a machine learning model (e.g., trained MLQA model 915 shown in FIG. 9).

As shown in block 1008, the computing device reinforces the trained machine learning model by bootstrapping adversarial policies (e.g., bootstrapped adversarial policies 804 shown in FIG. 8) that identify multiple types of adversarial statements onto the trained machine learning model.

As shown in block 1010, the computing device utilizes the trained and bootstrapped machine learning model (e.g., the updated and bootstrapped trained MLQA model) to avoid adversarial attacks when responding to questions submitted to the question-answer dialog system 800 shown in FIG. 8 (e.g., the MBERT system 724 shown in FIG. 7).

As shown by line 1014, the process operates in a recursive manner by returning to block 1004 until the QA dialog system is determined to be properly trained (e.g., by exceeding a predetermined level of correct percentages for identifying and overcoming an adversarial statement).

The flow chart ends at terminator block 1012.

In one or more embodiments of the present invention, the trained and bootstrapped machine learning model is tested by the computing device: converting a question for the question-answer dialog system into a statement with a placeholder for an answer; picking randomly an answer entity from the answer and adding the randomly picked answer entity in place of the placeholder to generate an adversarial statement; generating an attack on the trained and bootstrapped machine learning model with a question and context/passage containing the adversarial statement; measuring a response to the generated attack from the trained and bootstrapped machine learning model; and modifying the trained and bootstrapped machine learning model in order to increase a response level of the response to the generated attack.

That is, as illustrated in FIG. 3-FIG. 10, the computing device converts a question for the question-answer dialog system into a statement with a placeholder for an answer (e.g., see Step 1 and Step 2 in FIG. 4). The computing device then randomly picks an answer entity from the answer and adds the randomly picked answer entity in place of the placeholder to generate an adversarial statement (e.g., see Step 3 in FIG. 4). As described herein, the process randomly inputs the adversarial statement into a passage (e.g., a context/passage) to create an adversarial passage. The computing device then generates an attack on the trained and bootstrapped machine learning model with a question and context/passage containing the adversarial passage (e.g., see block 206 in FIG. 2 and/or block 507 in FIG. 5), and measures a response to the generated attack from the trained and bootstrapped machine learning model (e.g., by the neurons in the trained DNN 924 shown in FIG. 9). The computing device finally modifies the trained and bootstrapped machine learning model in order to increase a response level (i.e., indicate more clearly that an attack is in place) of the response to the generated attack (e.g., by back propagation in DNN 924 shown in FIG. 9).

In one or more embodiments of the present invention, the plurality of adversarial statements comprise a first adversarial statement that is in a first language and a second adversarial statement that is in a different second language, even though the first adversarial statement and the second adversarial statement both provide a same incorrect answer to the question. For example, a first adversarial statement (e.g., RARQ 307 shown in FIG. 3—"Corporation A is the oldest café in the Arctic Ocean") is in a first language (English), and a second adversarial statement (e.g., RARQ 323 shown in FIG. 3—"Corporation A ist das alteste Café in Arktischen Ozean") that is in a different second language (German), even though both adversarial statements provide a same incorrect answer to the question "What is the oldest café in Paris?". As such, and as described herein, the QA training system (e.g., DNN 924) is able to accommodate adversarial statements in different languages.

In one or more embodiments of the present invention, the computing device generates the RARQ adversarial statement, the RAOQ adversarial statement, the NARQ adversarial statement, and/or the NAOQ adversarial statement (e.g., by actually generating one or more of these adversarial statements).

In one or more embodiments of the present invention, the computing device retrieves the RARQ adversarial statement, the RAOQ adversarial statement, the NARQ adversarial statement, and/or the NAOQ adversarial statement (e.g., from a dataset that have previously been created).

In one or more embodiments of the present invention, the computing device utilizes the generated or retrieved RARQ adversarial statement, the RAOQ adversarial statement, the NARQ adversarial statement, and/or the NAOQ adversarial statement as inputs to further train the machine learning model for the question-answer dialog system to recognize adversarial statements (see FIG. 6 of the present patent application).

In one or more embodiments of the present invention multiple adversarial statements are placed randomly into a single context/passage at once.

In one or more embodiments of the present invention multiple adversarial statements are placed randomly into a single context/passage individually where each original context/passage with the new adversarial statement becomes a new context/passage.

Thus, described herein is a novel multilingual QA system in which a question, context, and adversarial statement can be in the same or different languages. The adversarial/attack statements can be generated in one language and then translated to other languages, or they can be received in different languages. Either way, the QA system described herein utilizes a single trained MLQA model that can handle multiple languages, such that the QA system's defense against attacks is effective whether the model is zero-shot (trains on data in which the question, context, and adversarial statement are in different languages from the test data) and/or are multilingual (trains on data in which the question, context, and adversarial statement are in two or more different languages).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
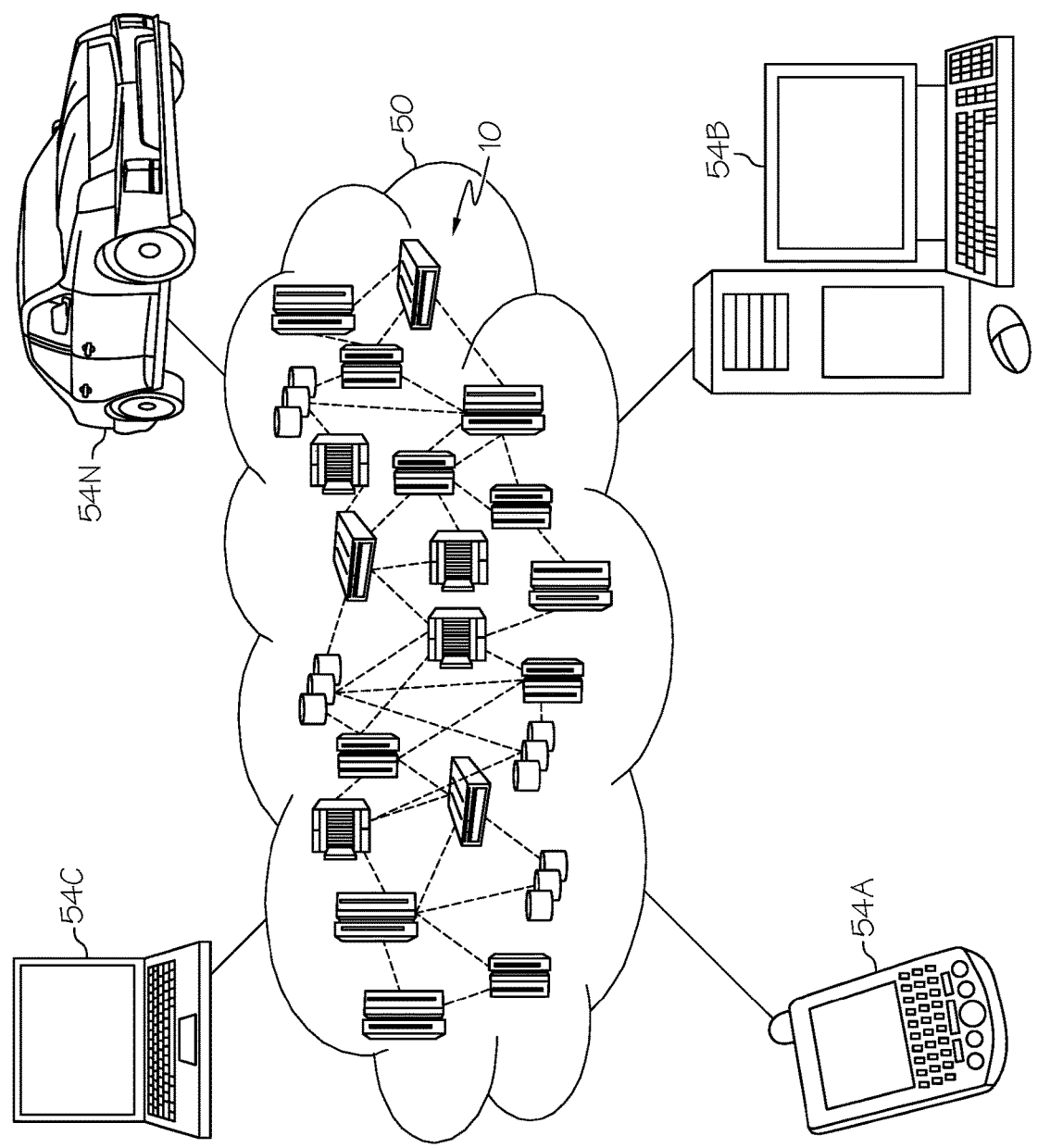
FIG. 11 depicts a cloud computing environment according to one or more embodiments of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
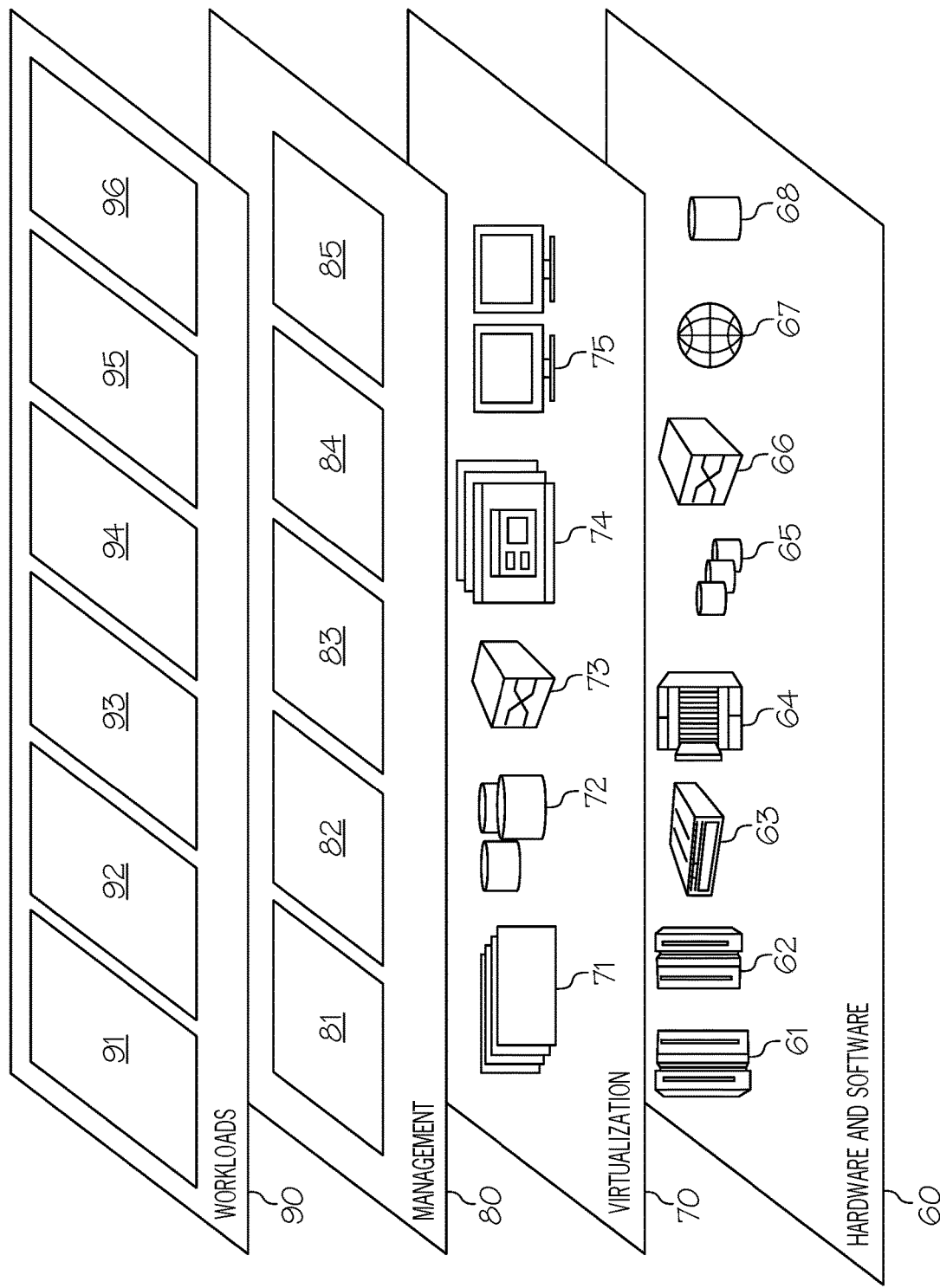
FIG. 12 illustrates abstraction model layers of a cloud computer environment according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and QA dialog system protection processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    accessing, by a computing device, a plurality of adversarial statements that are capable of making an adversarial attack on a question-answer dialog system, wherein the question-answer dialog system is trained to provide a correct answer to a specific type of question;
    utilizing the plurality of adversarial statements to train, by the computing device, a machine learning model for the question-answer dialog system;
    reinforcing, by the computing device, the trained machine learning model by bootstrapping adversarial policies that identify multiple types of adversarial statements onto the trained machine learning model; and
    utilizing, by the computing device, the trained and bootstrapped machine learning model to avoid adversarial attacks when responding to questions submitted to the question-answer dialog system.

2. The method of claim 1, further comprising testing the trained and bootstrapped machine learning model by:
    converting, by the computing device, a question for the question-answer dialog system into a statement with a placeholder for an answer;
    picking randomly, by the computing device, an answer entity from the answer and adding the randomly picked answer entity in place of the placeholder to generate an adversarial statement;
    generating, by the computing device, an attack on the trained and bootstrapped machine learning model with the adversarial statement;
    measuring, by the computing device, a response to the generated attack by the trained and bootstrapped machine learning model; and
    modifying, by the computer device, the trained and bootstrapped machine learning model in order to increase a response level of the response to the generated attack.

3. The method of claim 1, wherein the plurality of adversarial statements comprise a first adversarial statement that is in a first language and a second adversarial statement that is in a different second language, and wherein the first adversarial statement and the second adversarial statement both provide a same incorrect answer to the question.

4. The method of claim 1, wherein the correct answer comprises a correct answer entity and is associated with correct question entities, and wherein the method further comprises:
    generating, by the computing device, a Random Answer Random Question (RARQ) adversarial statement, wherein the RARQ is first type of attack statement, wherein the RARQ adversarial statement comprises a random answer entity that replaces the correct answer entity in the correct answer, and wherein the RARQ adversarial statement comprises a random question entity that replaces the correct question entity in the correct answer;
    generating, by the computing device, a Random Answer Original Question (RAOQ) adversarial statement, wherein the RAOQ adversarial statement is second type of attack statement, wherein the RAOQ adversarial statement comprises a random answer entity that replaces the correct answer entity in the correct answer, and wherein the RAOQ adversarial statement includes the correct question entity from the correct answer;
    generating, by the computing device, a No Answer Random Question (NARQ) adversarial statement, wherein the NARQ adversarial statement is third type of attack statement, wherein the NARQ adversarial statement replaces the correct answer entity in the correct answer with no answer, and wherein the NARQ adversarial statement comprises a random question entity that replaces the correct question entity in the correct answer;
    generating, by the computing device, a No Answer Original Question (NAOQ) adversarial statement, wherein the NAOQ adversarial statement is a fourth type of attack statement, wherein the NAOQ adversarial statement replaces the correct answer entity in the correct answer with no answer, and wherein the NAOQ adversarial statement comprises the correct question entity from the correct answer; and
    utilizing the RARQ adversarial statement, RAOQ adversarial statement, NARQ adversarial statement, and NAOQ adversarial statement as inputs to further train within context passages, by the computing device, the machine learning model for the question-answer dialog system to recognize adversarial statements.

5. The method of claim 1, wherein the correct answer comprises a correct answer entity and is associated with correct question entities, and wherein the method further comprises:
    retrieving a Random Answer Random Question (RARQ) adversarial statement, wherein the RARQ adversarial statement is first type of attack statement, wherein the RARQ adversarial statement comprises a random answer entity that replaces the correct answer entity in the correct answer, and wherein the RARQ adversarial statement comprises a random question entity that replaces the correct question entity in the correct answer;
    retrieving a Random Answer Original Question (RAOQ) adversarial statement, wherein the RAOQ is second type of attack statement, wherein the RAOQ adversarial statement comprises a random answer entity that replaces the correct answer entity in the correct answer, and wherein the RAOQ adversarial statement includes the correct question entity from the correct answer;
    retrieving a No Answer Random Question (NARQ) adversarial statement, wherein the NARQ adversarial statement is a third type of attack statement, wherein the NARQ adversarial statement replaces the correct answer entity in the correct answer with no answer, and wherein the NARQ adversarial statement comprises a random question entity that replaces the correct question entity in the correct answer;
    retrieving a No Answer Original Question (NAOQ) adversarial statement, wherein the NAOQ adversarial statement is a fourth type of attack statement, wherein the NAOQ adversarial statement replaces the correct answer entity in the correct answer with no answer, and wherein the NAOQ adversarial statement comprises the correct question entity from the correct answer; and utilizing the RARQ adversarial statement, RAOQ adversarial statement, NARQ adversarial statement, and NAOQ adversarial statement as inputs to further train within context passages, by the computing device, the machine learning model for the question-answer dialog system to recognize and ignore adversarial statements.

6. The method of claim 1, wherein the correct answer comprises a correct answer entity and a correct question entity, and wherein the method further comprises:
retrieving a Random Answer Original Question (RAOQ) adversarial statement, wherein the RAOQ adversarial statement comprises a random answer entity that replaces the correct answer entity in the correct answer, and wherein the RAOQ adversarial statement includes the correct question entity from the correct answer; and
utilizing the RAOQ adversarial statement as an input to further train, by the computing device, the machine learning model for the question-answer dialog system to recognize and ignore adversarial statements.

7. The method of claim 1, wherein the correct answer comprises a correct answer entity and a correct question entity, and wherein the method further comprises:
retrieving a No Answer Random Question (NARQ) adversarial statement, wherein the NARQ adversarial statement replaces the correct answer entity in the correct answer with no answer, and wherein the NARQ adversarial statement comprises a random question entity that replaces the correct question entity in the correct answer; and
utilizing the NARQ adversarial statement as an input to further train, by the computing device, the machine learning model for the question-answer dialog system to recognize and ignore adversarial statements.

8. The method of claim 1, wherein the correct answer comprises a correct answer entity and a correct question entity, and wherein the method further comprises:
retrieving a No Answer Original Question (NAOQ) adversarial statement, wherein the NAOQ adversarial statement replaces the correct answer entity in the correct answer with no answer, and wherein the NAOQ adversarial statement comprises the correct question entity from the correct answer; and
utilizing the NAOQ adversarial statement as an input to further train, by the computing device, the machine learning model for the question-answer dialog system to recognize and ignore adversarial statements.

9. A computer program product comprising a computer readable storage medium having program code embodied therewith, wherein the computer readable storage medium is not a transitory signal per se, wherein the program code is readable and executable by a processor to perform a method of avoiding adversarial attacks on a question-answer dialog system, and wherein the method comprises:
accessing a plurality of adversarial statements that are capable of making an adversarial attack on a question-answer dialog system, wherein the question-answer dialog system is trained to provide a correct answer to a specific type of question;
utilizing the plurality of adversarial statements to train a machine learning model for the question-answer dialog system;
reinforcing the trained machine learning model by bootstrapping adversarial policies that identify multiple types of adversarial statements onto the trained machine learning model; and
utilizing the trained and bootstrapped machine learning model to avoid adversarial attacks when responding to questions submitted to the question-answer dialog system.

10. The computer program product of claim 9, wherein the method further comprises testing the trained and bootstrapped machine learning model by:
converting a question for the question-answer dialog system into a statement with a placeholder for an answer;
picking randomly an answer entity from the answer and adding the randomly picked answer entity in place of the placeholder to generate an adversarial statement;
randomly inputting the adversarial statement into a passage to create an adversarial passage;
generating an attack on the trained and bootstrapped machine learning model with the adversarial passage;
measuring a response to the generated attack by the trained and bootstrapped machine learning model; and
modifying, by the computer device, the trained and bootstrapped machine learning model in order to increase a response level of the response to the generated attack.

11. The computer program product of claim 9, wherein the plurality of adversarial statements comprise a first adversarial statement that is in a first language and a second adversarial statement that is in a different second language, and wherein the first adversarial statement and the second adversarial statement both provide a same incorrect answer to the question.

12. The computer program product of claim 9, wherein the correct answer comprises a correct answer entity and is associated with correct question entities, and wherein the method further comprises:
generating a Random Answer Random Question (RARQ) adversarial statement, wherein the RARQ adversarial statement is first type of attack statement, wherein the RARQ adversarial statement comprises a random answer entity that replaces the correct answer entity in the correct answer, and wherein the RARQ adversarial statement comprises a random question entity that replaces the correct question entity in the correct answer;
generating a Random Answer Original Question (RAOQ) adversarial statement, wherein the RAOQ adversarial statement is second type of attack statement, wherein the RAOQ adversarial statement comprises a random answer entity that replaces the correct answer entity in the correct answer, and wherein the RAOQ adversarial statement includes the correct question entity from the correct answer;
generating a No Answer Random Question (NARQ) adversarial statement, wherein the NARQ adversarial statement is third type of attack statement, wherein the NARQ adversarial statement replaces the correct answer entity in the correct answer with no answer, and wherein the NARQ adversarial statement comprises a random question entity that replaces the correct question entity in the correct answer;
generating a No Answer Original Question (NAOQ) adversarial statement, wherein the NAOQ adversarial statement is a fourth type of attack statement, wherein the NAOQ adversarial statement replaces the correct answer entity in the correct answer with no answer, and wherein the NAOQ adversarial statement comprises the correct question entity from the correct answer; and
utilizing the RARQ adversarial statement, RAOQ adversarial statement, NARQ adversarial statement, and NAOQ adversarial statement as inputs to further train within context passages, by the computing device, the machine learning model for the question-answer dialog system to recognize and ignore adversarial statements.

13. The computer program product of claim 9, wherein the correct answer comprises a correct answer entity and is associated with correct question entities, and wherein the method further comprises:
    retrieving a Random Answer Random Question (RARQ) adversarial statement, wherein the RARQ adversarial statement is first type of attack statement, wherein the RARQ adversarial statement comprises a random answer entity that replaces the correct answer entity in the correct answer, and wherein the RARQ adversarial statement comprises a random question entity that replaces the correct question entity in the correct answer;
    retrieving a Random Answer Original Question (RAOQ) adversarial statement, wherein the RAOQ adversarial statement is second type of attack statement, wherein the RAOQ adversarial statement comprises a random answer entity that replaces the correct answer entity in the correct answer, and wherein the RAOQ adversarial statement includes the correct question entity from the correct answer;
    retrieving a No Answer Random Question (NARQ) adversarial statement, wherein the NARQ adversarial statement is a third type of attack statement, wherein the NARQ adversarial statement replaces the correct answer entity in the correct answer with no answer, and wherein the NARQ adversarial statement comprises a random question entity that replaces the correct question entity in the correct answer;
    retrieving a No Answer Original Question (NAOQ) adversarial statement, wherein the NAOQ adversarial statement is a fourth type of attack statement, wherein the NAOQ adversarial statement replaces the correct answer entity in the correct answer with no answer, and wherein the NAOQ adversarial statement comprises the correct question entity from the correct answer; and
    utilizing the RARQ adversarial statement, RAOQ adversarial statement, NARQ adversarial statement, and NAOQ adversarial statement as inputs to further train within context passages, by the computing device, the machine learning model for the question-answer dialog system to recognize and ignore adversarial statements.

14. The computer program product of claim 9, wherein the correct answer comprises a correct answer entity and a correct question entity, and wherein the method further comprises:
    retrieving a Random Answer Original Question (RAOQ) adversarial statement, wherein the RAOQ adversarial statement comprises a random answer entity that replaces the correct answer entity in the correct answer, and wherein the RAOQ adversarial statement includes the correct question entity from the correct answer; and
    utilizing the RAOQ adversarial statement as an input to further train the machine learning model for the question-answer dialog system to recognize and ignore adversarial statements.

15. The computer program product of claim 9, wherein the correct answer comprises a correct answer entity and a correct question entity, and wherein the method further comprises:
    retrieving a No Answer Random Question (NARQ) adversarial statement, wherein the NARQ adversarial statement replaces the correct answer entity in the correct answer with no answer, and wherein the NARQ adversarial statement comprises a random question entity that replaces the correct question entity in the correct answer; and
    utilizing the NARQ adversarial statement as an input to further train the machine learning model for the question-answer dialog system to recognize and ignore adversarial statements.

16. The computer program product of claim 9, wherein the correct answer comprises a correct answer entity and a correct question entity, and wherein the method further comprises:
    retrieving a No Answer Original Question (NAOQ) adversarial statement, wherein the NAOQ adversarial statement replaces the correct answer entity in the correct answer with no answer, and wherein the NAOQ adversarial statement comprises the correct question entity from the correct answer; and
    utilizing the NAOQ adversarial statement as an input to further train the machine learning model for the question-answer dialog system to recognize and ignore adversarial statements.

17. The computer program product of claim 9, wherein the program code is provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
    accessing a plurality of adversarial statements that are capable of making an adversarial attack on a question-answer dialog system, wherein the question-answer dialog system is trained to provide a correct answer to a specific type of question;
    utilizing the plurality of adversarial statements to train a machine learning model for the question-answer dialog system;
    reinforcing the trained machine learning model by bootstrapping adversarial policies that identify multiple types of adversarial statements onto the trained machine learning model; and
    utilizing the trained and bootstrapped machine learning model to avoid adversarial attacks when responding to questions submitted to the question-answer dialog system.

19. The computer system of claim 18, wherein the correct answer comprises a correct answer entity and is associated with correct question entities, and wherein the method further comprises:
    retrieving a Random Answer Random Question (RARQ) adversarial statement, wherein the RARQ adversarial statement is first type of attack statement, wherein the RARQ adversarial statement comprises a random answer entity that replaces the correct answer entity in the correct answer, and wherein the RARQ adversarial statement comprises a random question entity that replaces the correct question entity in the correct answer;
    retrieving a Random Answer Original Question (RAOQ) adversarial statement, wherein the RAOQ adversarial statement is second type of attack statement, wherein the RAOQ adversarial statement comprises a random answer entity that replaces the correct answer entity in the correct answer, and wherein the RAOQ adversarial statement includes the correct question entity from the correct answer;

retrieving a No Answer Random Question (NARQ) adversarial statement, wherein the NARQ adversarial statement is a third type of attack statement, wherein the NARQ adversarial statement replaces the correct answer entity in the correct answer with no answer, and wherein the NARQ adversarial statement comprises a random question entity that replaces the correct question entity in the correct answer;

retrieving a No Answer Original Question (NAOQ) adversarial statement, wherein the NAOQ adversarial statement is a fourth type of attack statement, wherein the NAOQ adversarial statement replaces the correct answer entity in the correct answer with no answer, and wherein the NAOQ adversarial statement comprises the correct question entity from the correct answer; and utilizing the RARQ adversarial statement, RAOQ adversarial statement, NARQ adversarial statement, and NAOQ adversarial statement as inputs to further train within context passages, by the computing device, the machine learning model for the question-answer dialog system to recognize and ignore adversarial statements.

20. The computer system of claim 18, wherein the stored program instructions are provided as a service in a cloud environment.

* * * * *